(12) United States Patent
Sekiguchi et al.

(10) Patent No.: US 12,497,536 B2
(45) Date of Patent: Dec. 16, 2025

(54) ANTICORROSION STRUCTURE AND MANUFACTURING METHOD THEREFOR

(71) Applicant: SHIN-ETSU POLYMER CO., LTD., Tokyo (JP)

(72) Inventors: Yoshihiko Sekiguchi, Saitama (JP); Atsushi Komori, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 425 days.

(21) Appl. No.: 18/004,448

(22) PCT Filed: Jul. 6, 2021

(86) PCT No.: PCT/JP2021/025399
§ 371 (c)(1),
(2) Date: Jan. 6, 2023

(87) PCT Pub. No.: WO2022/009861
PCT Pub. Date: Jan. 13, 2022

(65) Prior Publication Data
US 2023/0295462 A1    Sep. 21, 2023

(30) Foreign Application Priority Data
Jul. 9, 2020   (JP) .................................. 2020-118259

(51) Int. Cl.
*F16B 33/00*   (2006.01)
*C09D 5/08*    (2006.01)
*C09D 183/04*  (2006.01)
*F16B 37/14*   (2006.01)

(52) U.S. Cl.
CPC ............. *C09D 183/04* (2013.01); *C09D 5/08* (2013.01); *F16B 33/008* (2013.01)

(58) Field of Classification Search
CPC ....... F16B 37/14; F16B 33/004; F16B 33/008
USPC ........................................................ 411/377
See application file for complete search history.

(56) References Cited

U.S. PATENT DOCUMENTS 3,470,787 A * 10/1969 Mackie ................. F16B 33/004
                                                277/645
4,143,454 A *  3/1979 Utsunomiya ............. E02B 3/26
                                                  52/515
4,557,654 A * 12/1985 Masuda .................. F16B 37/14
                                                 411/431
(Continued)

FOREIGN PATENT DOCUMENTS

CN    105599217 A    5/2016
CN    108223543 A    6/2018
(Continued)

OTHER PUBLICATIONS

Office Action in CN application No. 202180046600.X, dated Mar. 31, 2025, 13pp.

(Continued)

*Primary Examiner* — Flemming Saether
(74) *Attorney, Agent, or Firm* — HAUPTMAN HAM, LLP

(57) ABSTRACT

An anticorrosion structure includes at least one of a metal bolt and a metal nut, and an anticorrosion member coating a portion, protruding beyond a connection surface, of a connecting part using at least one of the bolt and the nut, the anticorrosion member being formed of a silicone rubber obtained by curing a silicone rubber compound.

3 Claims, 19 Drawing Sheets

(56) References Cited

U.S. PATENT DOCUMENTS

| | | | | |
|---|---|---|---|---|
| 5,322,381 | A * | 6/1994 | Argo, II | B65D 47/06 |
| | | | | 401/265 |
| 7,223,920 | B2 * | 5/2007 | Dailey | F16B 37/14 |
| | | | | 174/138 D |
| 9,849,637 | B2 * | 12/2017 | Pajel | B29C 45/14336 |
| 10,578,146 | B2 * | 3/2020 | Etling | F16B 21/183 |
| 2013/0186552 | A1 | 7/2013 | Asahara et al. | |
| 2015/0034800 | A1 * | 2/2015 | Martinez-Marin | F16B 37/14 |
| | | | | 249/184 |
| 2016/0136859 | A1 | 5/2016 | Song | |

FOREIGN PATENT DOCUMENTS

| | | |
|---|---|---|
| CN | 109609071 A | 4/2019 |
| JP | H2138488 A | 5/1990 |
| JP | H9112520 A | 5/1997 |
| JP | 2002227819 A | 8/2002 |
| JP | 2005146198 A | 6/2005 |
| JP | 2011-521189 A | 7/2011 |
| JP | 2013147079 A | 8/2013 |
| JP | 201697678 A | 5/2016 |
| JP | 201788692 A | 5/2017 |
| JP | 2019196814 A | 11/2019 |

OTHER PUBLICATIONS

International Search Report in PCT/JP2021/025399, mailed Sep. 14, 2021, 3pp.
Written Opinion in PCT/JP2021/025399, mailed Sep. 14, 2021, 5pp.

* cited by examiner

ANTICORROSION STRUCTURE AND MANUFACTURING METHOD THEREFOR

CROSS-REFERENCE

The present application is a National Phase of International Application No. PCT/JP2021/025399 filed Jul. 6, 2021, and claims priority based on Japanese Patent Application No. 2020-118259 filed in Japan on Jul. 9, 2020, and the disclosure of the application is incorporated herein by reference. Further, the disclosures of the patents, patent applications and documents cited in the present application are incorporated herein by reference.

TECHNICAL FIELD

The present invention relates to an anticorrosion structure and a method for producing the same.

BACKGROUND ART

In various structures, a method for connecting members to each other with a bolt and a nut has been conventionally employed. In general, when a bolt and a nut are connected to each other, a screw portion of the bolt and the nut protrude beyond a connection surface and hence are likely to be exposed to the weather, which causes a problem of easy rusting. As anticorrosion means for bolts and nuts, a method employing anticorrosion coating of bolts and nuts is performed. Since bolts and nuts have, however, complicated structures, there arises a problem that the anticorrosion effect is lost in a short period of time because rainwater having entered through a gap is not easily drained. Therefore, as anticorrosion means for bolts and nuts to be employed instead of the anticorrosion coating, a method of coating a connecting part between a bolt and a nut with a resin anticorrosion member (cap) is known (see, for example, Patent Literature 1 and Patent Literature 2).

CITATION LIST

Patent Literature

Patent Literature 1: Japanese Patent Laid-Open No. 2-138488
Patent Literature 2: Japanese Patent Laid-Open No. 2002-227819

SUMMARY OF INVENTION

Technical Problem

Many of such anticorrosion members are generally produced using a resin such as vinyl chloride or an epoxy resin. Therefore, in an anticorrosion structure including the above-described anticorrosion member in a connecting part using at least one of a metal bolt and a metal nut, the anticorrosion member may be cracked or cleaved, or the anticorrosion member may be lifted due to aging, and if the anticorrosion member is left as it is, the anticorrosion effect might be degraded. Accordingly, there is a demand for an anticorrosion structure having a high anticorrosion effect.

The present invention was devised in consideration of the above-described problems, and an object is to provide an anticorrosion structure having a high anticorrosion effect, and a method for producing the same.

Solution to Problem (1) An anticorrosion structure according to one embodiment for achieving the above-described object, comprises at least one of a metal bolt and a metal nut, and an anticorrosion member coating a portion, protruding beyond a connection surface, of a connecting part using at least one of the bolt and the nut, wherein the anticorrosion member is formed of a silicone rubber obtained by curing a silicone rubber compound.

(2) In the anticorrosion structure according to another embodiment, the anticorrosion member may preferably include a coating layer that is formed of a silicone rubber and coats the connection surface.

(3) In the anticorrosion structure according to another embodiment, the coating layer may preferably include an adhesion layer at least on a side of the connection surface.

(4) In the anticorrosion structure according to another embodiment, the coating layer may be preferably formed of the silicone rubber obtained by curing a silicone rubber compound having a plasticity number of 100 to 600.

(5) In the anticorrosion structure according to another embodiment, the anticorrosion member may be preferably formed of the silicone rubber obtained by curing the silicone rubber compound having a plasticity number of 100 to 400.

(6) A method for producing an anticorrosion structure according to one embodiment is a method for producing any one of the anticorrosion structures described above, and comprises: a coating step of, with a silicone rubber compound, coating a portion, protruding beyond a connection surface, of a connecting part using at least one of a metal bolt and a metal nut; and a curing step of curing the silicone rubber compound.

(7) In the method for producing the anticorrosion structure according to another embodiment, in the coating step, the portion of the connecting part protruding beyond the connection surface may be coated with the silicone rubber compound by overlaying a mold to cover the portion of the connecting part protruding beyond the connection surface in a state of the silicone rubber compound being supplied to the portion of the connecting part protruding beyond the connection surface.

(8) In the method for producing the anticorrosion structure according to another embodiment, in the coating step, the mold preferably may include an inner mold that covers the portion of the connecting part protruding beyond the connection surface, and is separable into two or more pieces, and an outer mold covering the inner mold.

(9) The method for producing the anticorrosion structure according to another embodiment may preferably further comprise a coating layer forming step of forming a coating layer by coating the connection surface with a silicone rubber.

(12) In the method for producing the anticorrosion structure according to another embodiment, in the coating layer forming step, the coating layer may be preferably formed by coating the connection surface with a silicone rubber sheet including an adhesion layer in such a manner as to have the adhesion layer at least on a side of the connection surface.

Advantageous Effects of Invention

According to the present invention, an anticorrosion structure having a high anticorrosion effect and a method for producing the same can be provided.

DESCRIPTION OF EMBODIMENTS

Preferred embodiments of the present invention will now be described with reference to the accompanying drawings. The embodiments described below do not limit the claimed invention. All of elements and combinations thereof described in the embodiments are not necessarily essential for solution by the present invention.

1. Anticorrosion Structure

First Embodiment

Figure 1:
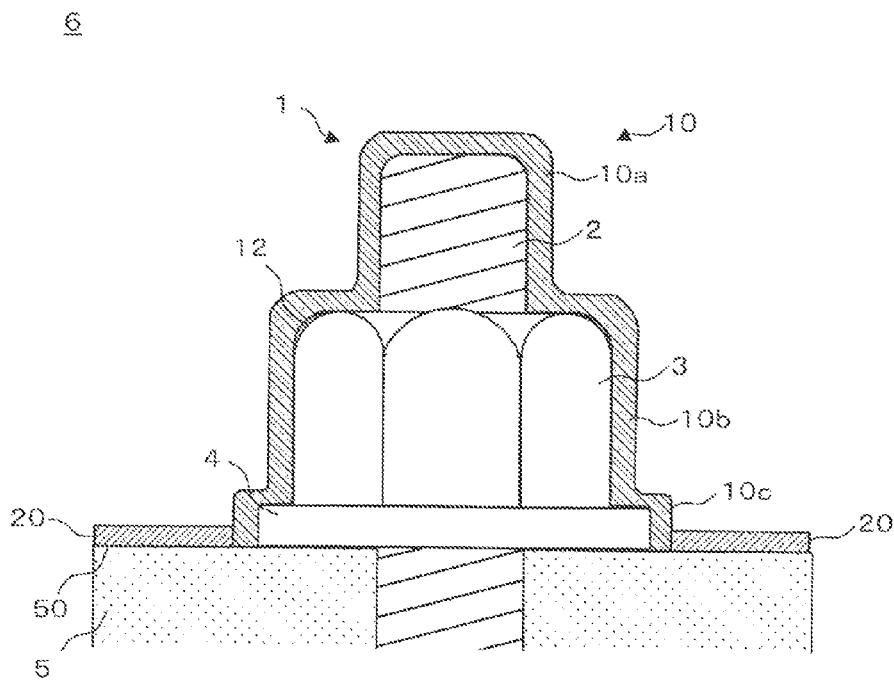
FIG. 1 shows a vertical cross-sectional view of an anticorrosion structure according to a first embodiment.

FIG. 1 shows a vertical cross-sectional view of an anticorrosion structure according to a first embodiment. Here, the term "vertical cross-sectional view" means a view obtained by vertically cutting the structure in a direction from a volt leg toward a nut. The same applies to the other embodiments described below.

(1) Outline Configuration

An anticorrosion structure 6 according to this embodiment includes at least one of a metal bolt 2 and a metal nut 3, and an anticorrosion member 1 coating a portion, protruding beyond a connection surface 50, of a connecting part using the at least one of the bolt 2 and the nut 3. Here, the term "metal" means a metal not particularly limited such as iron or an iron-based alloy (including SUS). The anticorrosion member 1 includes a main body 10 formed of a silicone rubber obtained by curing a silicone rubber compound. The anticorrosion member 1 also includes a coating layer 20 preferably formed of a silicone rubber for coating the connection surface 50. In this embodiment, the anticorrosion member 1 coats the portion, protruding beyond the connection surface 50, of the connecting part using the bolt 2 and the nut 3 connected to a structure 5. Now, constituent elements of the anticorrosion member 1 provided in the anticorrosion structure 6 will be described in detail.

(2) Main Body

The main body 10 is a member for coating the portion, protruding beyond the connection surface 50, of the connecting part using the bolt 2 and the nut 3. The main body 10 includes a recess 12 where the portion of the connecting part protruding beyond the connection surface 50 is disposed. The main body 10 includes, for example, a head portion 10a coating a screw portion (leg portion) of the bolt 2 protruding beyond the nut 3, a trunk portion 10b coating a side surface portion of the nut 3, and a flange portion 10c coating a washer 4 disposed between the nut 3 and the connection surface 50. The main body 10 is preferably configured in a shape according to the shape of the member to be disposed in the recess 12 (such as the screw portion of the bolt 2, the nut 3, and the washer 4). The shapes of the main body 10 and the recess 12 are not limited to the shapes illustrated in FIG. 1, but are preferably appropriately designed according to the shape of the member to be disposed in the recess 12. For example, if the washer 4 is not used in the connecting part, the flange portion 10c may not be provided.

(2-1) Silicone Rubber

The silicone rubber is a rubber-like elastic body having a siloxane bond (—Si—O—Si) as a main skeleton. A silicone rubber usable in this embodiment may be obtained by any of curing types such as addition curing type, condensation reaction type, UV curing type, and electron beam curing type, and is preferably an addition-curing type silicone rubber in particular. The silicone rubber is a rubber-like elastic body obtained by curing a curable organopolysiloxane composition containing an organopolysiloxane as a main agent (silicone rubber compound). Here, the term "main agent" means an agent having a largest mass ratio among components contained in the curable organopolysiloxane composition. The organopolysiloxane is contained in the curable organopolysiloxane composition preferably in an amount of 50% by mass or more, and the amount may be less than 50% by mass as far as it is the main agent. Now, as the silicone rubber compound used as a raw material before curing the silicone rubber, examples of addition-curing type and condensation curing type curable organopolysiloxane compositions will be described.

Addition-Curing Type

The addition-curing type curable organopolysiloxane composition may be designated as an addition-curing type curable silicone composition or an addition-curing type curable silicone rubber composition. The addition-curing type curable organopolysiloxane composition can be mainly formed of, for example, the following components:

(2-1-1) Organopolysiloxane

An organopolysiloxane is a main agent of the addition-curing type curable organopolysiloxane composition, and has an average of two or more alkenyl groups per molecule. The organopolysiloxane is a base polymer of the addition-curing type curable organopolysiloxane composition, and is represented by the following average composition formula (I):

$$R^3_a SiO_{(4-a)/2} \tag{I}$$

In the formula (I), $R^3$ is the same or different unsubstituted or substituted monovalent hydrocarbon group having 1 to 12, preferably 1 to 10, and more preferably 1 to 8 carbon atoms, and a is a positive number in a range of 1.5 to 2.8, preferably 1.8 to 2.5, and more preferably 1.95 to 2.05.

Examples of the alkenyl group include vinyl groups, allyl groups, butenyl groups, pentenyl groups, hexenyl groups and heptenyl groups. Among them, vinyl groups are preferably used. Examples of the organic group bonded to silicon atoms, other than alkenyl groups, in this component include alkyl groups (methyl group, ethyl group, propyl group, butyl group, pentyl group, hexyl group and the like), aryl groups (phenyl group, tolyl group, xylyl group and the like), and alkyl halide groups (3-chloropropyl group, 3,3,3-trifluoropropyl group and the like). Among them, a methyl group is preferably used. Examples of the molecular structure of this component include straight-chain structures, partially branched straight-chain structures, branched-chain structures, network structures and dendritic structures.

As the organopolysiloxane of this component, for example, polydimethylsiloxanes blocked with a dimethylvinylsiloxy group at both terminals of the molecular chain, copolymers of dimethylsiloxanes blocked with a dimethylvinylsiloxy group at both terminals of the molecular chain and methylvinylsiloxanes, copolymers of dimethylsiloxanes blocked with a trimethylsiloxy group at both terminals of the molecular chain and methylvinylsiloxanes, organopolysiloxanes including a siloxane unit represented by $(CH_3)_3SiO_{1/2}$, a siloxane unit represented by $(CH_3)_2(CH_2=CH)SiO_{1/2}$ and a siloxane unit represented by $SiO_{4/2}$, such organopolysiloxanes in which some of methyl groups are replaced with a substituent selected from alkyl groups (ethyl group, propyl group and the like), aryl groups (phenyl group, tolyl group and the like) and alkyl halide groups (3,3,3-trifluoropropyl group and the like), such organopolysiloxanes in which some of vinyl groups are replaced with an alkenyl group (allyl group, propenyl group or the like), and mixtures of two or more of these organopolysiloxanes can be used.

(2-1-2) Hydrogenated Organopolysiloxane

A hydrogenated organopolysiloxane acts as a curing agent for the addition-curable type curable organopolysiloxane composition, and has an average of two or more hydrogens bonded to silicon atoms per molecule. The hydrogenated organopolysiloxane is designated also as an organohydrogen polysiloxane. The hydrogenated organopolysiloxane is represented by the following average composition formula (II), and one having at least 2, preferably 3 or more, more preferably 3 to 100, and further preferably 4 to 50 hydrogen atoms bonded silicon atoms (SiH groups) per molecule is suitably used.

$$R^4_b H_c SiO_{(4-b-c)/2} \tag{II}$$

In the formula (II), $R^4$ is the same or different unsubstituted or substituted monovalent hydrocarbon group having 1 to 12, preferably 1 to 10, and more preferably 1 to 8 carbon atoms. b is 0.7 to 2.1, c is 0.001 to 1.0, and b+c is a positive number of 0.8 to 3.0.

Examples of the organic group bonded to silicon in this component include alkyl groups (methyl group, ethyl group, propyl group, butyl group, pentyl group, hexyl group and the like), aryl groups (phenyl group, tolyl group, xylyl group and the like), and alkyl halide groups (3-chloropropyl group, 3,3,3-trifluoropropyl group and the like). Among them, a methyl group is preferably used. Examples of the molecular structure of this component include straight-chain structures, partially branched straight-chain structures, branched-chain structures, network structures and dendritic structures.

As the hydrogenated organopolysiloxane of this component, for example, polydimethylsiloxanes blocked with a dimethylhydrogensiloxy group at both terminals of the molecular chain, polymethylhydrogensiloxanes blocked with a trimethylsiloxy group at both terminals of the molecular chain, copolymers of dimethylsiloxanes blocked with a trimethylsiloxy at both terminals of the molecular chain and methylhydrogensiloxanes, cyclic polymethylhydrogensiloxanes, organopolysiloxanes including a siloxane unit represented by $(CH_3)_2HSiO_{1/2}$ and a siloxane unit represented by $SiO_{4/2}$, such organopolysiloxanes in which some of methyl groups are replaced with a alkyl group (ethyl group, propyl group or the like), an aryl group (phenyl group, tolyl group or the like) or an alkyl halide group (3,3,3-trifluoropropyl group or the like), and mixtures of two or more of these organopolysiloxanes can be used. Among them, mixtures of organopolysiloxanes, which have hydrogen atoms bonded to silicon atoms, only at both terminals of the molecular chain and organopolysiloxanes, which have a silicon atom bond, on the side chain of the molecular chain are preferably used for enhancing mechanical properties (especially elongation) of cured products to be obtained.

The content of this component in the addition-curable type curable organopolysiloxane composition is such that the molar ratio of hydrogen atoms bonded to silicon atoms in this component to alkenyl groups in the component (2-1-1) is within the range of 0.01 to 20, preferably within the range of 0.1 to 10, further preferably within the range of 0.1 to 5.

The reason why the content is set within the above-described range is that when the content of this component is not below the lower limit of the range, the silicone rubber tends to be easily sufficiently cured, and when the content of this component is not above the upper limit of the range, a resultant cured adhesive sheet tends to have higher mechanical properties. When a mixture of an organopolysiloxane, which has hydrogen atoms bonded to silicon atoms, only at both terminals of the molecular chain and an organopolysiloxane, which has a silicon atom bond, on the side chain of the molecular chain is used as this component, the content of the former organopolysiloxane is such that the molar ratio of hydrogen atoms bonded to silicon atoms in this component to alkenyl groups in the component (2-1-1) is preferably within the range of 0.01 to 10, further preferably within the range of 0.1 to 10, furthermore preferably within the range of 0.1 to 5. The content of the latter organopolysiloxane is such that the molar ratio of hydrogen atoms bonded to silicon atoms in this component to alkenyl groups in the component (2-1-1) is preferably within the range of 0.5 to 20, further preferably within the range of 0.5 to 10, furthermore preferably within the range of 0.5 to 5.

(2-1-3) Curing Catalyst

A curing catalyst is not essential, and preferred examples thereof include platinum-based catalysts for hydrosilylation reaction. Examples of the platinum-based catalyst for hydrosilylation reaction include platinum fine powder, platinum black, platinic chloride, alcohol-modified platinic chloride, complexes of platinum and diketone, complexes of platinic chloride and olefins, complexes of platinum chloride and alkenylsiloxanes, and such catalysts supported on carriers (alumina, silica, carbon black and the like). Among them, complexes of platinic chloride and alkenylsiloxanes are preferably used because of high catalytic activity. Complexes of platinic chloride and divinyltetramethyldisiloxane are further preferably used. The amount of this component blended is preferably within the range of 1 to 1000 parts by mass, further preferably within the range of 1 to 100 parts by mass, in terms of platinum metal atoms, based on 1,000,000 parts by mass of the component (2-1-1).

(2-1-4) Filler

It is preferable to add a filler for enhancing the mechanical strength of the addition-curable type curable organopolysiloxane composition, and the filler may be a known compound that is commonly used for formulation of silicone rubber. Examples of this component include fumed silica, precipitated silica, fired silica, ground quartz, and such silica powder whose surface has been treated with an organosilicon compound (organoalkoxysilane, organohalosilane, organosilazane or the like). It is preferable that in particular, a silica powder having a BET specific surface area of 50 m²/g or more be used as this component for sufficiently enhancing the mechanical strength of the cured material.

Addition of this component is optional in the addition-curable type curable organopolysiloxane composition, but for enhancing the mechanical strength of the cured silicone rubber, the amount of this component blended is preferably within the range of 1 to 1000 parts by mass, further preferably within the range of 1 to 400 parts by mass, based on 100 parts by mass of the component (2-1-1). Further, the addition-curable type curable organopolysiloxane composition may contain other optional components, for example inorganic and organic fillers such as fumed titanium oxide, diatomaceous earth, iron oxide, aluminum oxide, aluminosilicate, calcium carbonate, zinc oxide and aluminum hydroxide. The addition-curable type curable organopolysiloxane composition may contain such fillers whose surfaces have been treated with the organosilicon compound. The amount of the filler blended can be selected according to the purpose and the type of filler, but is within the range of 1 to 90% by volume, preferably within the range of 5 to 60% by volume, based on the amount of the component (2-1-1).

(2-1-5) Other Components

The addition-curing type curable organopolysiloxane composition preferably further contains, for adjusting the curability thereof, acetylene-based compounds (3-methyl-1-buten-3-ol, 3,5-dimethyl-1-hexyn-3-ol, 3-phenyl-1-butyn-3-ol and the like), enyne compounds (3-methyl-3-penten-1-yne, 3,5-dimethyl-3-hexen-1-yne and the like), organosiloxane compounds having vinyl groups in an amount of 5% by mass or more per molecule (1,3,5,7-tetramethyl-1,3,5,7-tetravinylcyclotetrasiloxane, 1,3,5,7-tetramethyl-1,3,5,7-tetrahexenylcyclotetrasiloxane, methylvinylsiloxanes blocked with a silanol group at both terminals of the molecular chain, copolymers of methylvinylsiloxanes blocked with a silanol group at both terminals of the molecular chain and dimethylsiloxanes, and the like), or other curing controlling agents (triazoles such as benzotriazole, phosphines, mercaptans, hydrazines and the like). The content of these compounds is not limited, but is preferably within the range of 0.001 to 5 parts by mass based on 100 parts by mass of the component (2-1-1).

The method for preparing the addition-curable type curable organopolysiloxane composition is not limited, and the addition-curable self-adhesive silicone rubber can be prepared by mixing other optional components if necessary, but it is preferable that to a base compound prepared by heating and mixing the components (2-1-1) and (2-1-3) beforehand, other components be added. When adding the other optional components, these components may be added at the time of preparing the base compound, and if the other optional components are degenerated by heating and mixing, these components may be added at the time of adding the components (2-1-2) and (2-1-4). Further, at the time of preparing the base compound, the organic silicon compound may be added to treat the surface of the component (2-1-3) in situ.

Condensation Reaction Type

The condensation reaction type curable silicone rubber composition can be mainly formed of, for example, the following components:

(2-1-6) Organopolysiloxane

An organopolysiloxane is a main agent component of the condensation reaction type curable silicone rubber composition, and is preferably a diorganopolysiloxane represented by the following chemical formula (1) or chemical formula (2). The chemical formula may be designated as an average composition formula.

[Formula 1]

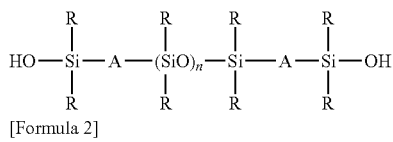

(1)

[Formula 2]

-continued

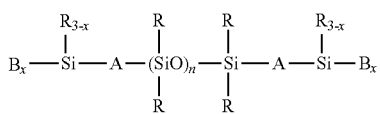
(2)

In the chemical formulae (1) and (2), R is a monovalent hydrocarbon group. R may be one or more hydrocarbon groups selected from alkyl groups (methyl group, ethyl group, propyl group, butyl group, 2-ethylbutyl group, octyl group and the like), cycloalkyl groups (cyclohexyl group, cyclopentyl group and the like), alkenyl groups (vinyl group, propenyl group, butenyl group, heptenyl group, hexenyl group, allyl group and the like), aryl groups (phenyl group, tolyl group, xylyl group, naphthyl group, diphenyl group and the like), aralkyl groups (benzyl group, phenylethyl group and the like), and groups formed by replacing at least some of hydrogen atoms bonded to carbon atoms of each of the above hydrocarbon groups with halogens, cyano groups or the like (chloromethyl group, trifluoropropyl group, 2-cyanoethyl group, 3-cyanopropyl group and the like). The number of carbon atoms in R is preferably 1 to 12, further preferably 1 to 10. In the chemical formulae (1) and (2), A is an oxygen atom or a polymethylene group (including a methylene group) represented by $-(CH_2)_m-$ (m is 1 to 8). A is preferably an oxygen atom or an ethylene group.

In the chemical formulae (1) and (2), n is any number at which the dynamic viscosity of the component (2-1-6) at 25° C. is within the range of 100 to 1000000 cm²/s. The dynamic viscosity is further preferably within the range of 500 to 500000 cm²/s.

In the chemical formulae (1) and (2), B is a hydrolysable group. Examples of the group B include alkoxy groups (methoxy group, ethoxy group, propoxy group, butoxy group and the like), ketoxime groups (dimethylketoxime group, methylethylketoxime group and the like), acyloxy groups (acetoxy group and the like) and alkenyloxy groups (isopropenyloxy group, isobutenyloxy group and the like). In the chemical formulae (1) and (2), x is 2 or 3.

The component (2-1-6) can be produced by a known method (for example, an equilibrium reaction method using a cyclic siloxane or linear oligomer and an acid catalyst or base catalyst).

When a branched structure is introduced into the diorganopolysiloxane used as the component (2-1-6), it is possible to use, as an ordinary method, a method in which a silane or siloxane containing at least one of a $SiO_{3/2}$ unit and a $SiO_{4/2}$ unit is added during polymerization in such a manner that the diorganopolysiloxane does not turn into a gel. It is preferable to use the component (2-1-6) after removing low-molecular siloxanes by washing or the like for reducing contamination.

(2-1-7) Crosslinker

As a crosslinker, a silane having two or more, preferably three or more hydrolysable groups per molecule, or a partially hydrolyzed and condensed product of the silane is used. Examples of the hydrolysable group include alkoxy groups (methoxy group, ethoxy group, butoxy group and the like), ketoxime groups (dimethylketoxime group, methylethylketoxime group and the like), acyloxy groups (acetoxy group and the like), alkenyloxy groups (isopropenyloxy group, isobutenyloxy group and the like), amino groups (N-butylamino group, N,N-diethylamino group and the like) and amide groups (N-methylacetamide group and the like). Among them, alkoxy groups, ketoxime groups, acyloxy groups and alkenyloxy groups are preferable. The amount of the crosslinker blended is preferably within the range of 1 to 50 parts by mass, further preferably within the range of 2 to 30 parts by mass, and furthermore preferably within the range of 5 to 20 parts by mass, based on 100 parts by mass of the component (2-1-6).

(2-1-8) Curing Catalyst

A curing catalyst is not essential, but use of a curing catalyst can accelerate curing of the curable silicone rubber composition. Examples of the curing catalyst include alkyltin ester compounds (dibutyltin diacetate, dibutyltin dilaurate, dibutyltin dioctoate and the like), titanic acid esters or titanium chelate compounds (tetraisopropoxy titanium, tetra-n-butoxy titanium, tetrakis(2-ethylhexoxy)titanium, dipropoxybis(acetylacetona)titanium, titanium isopropoxyoctylene glycol and the like), other appropriate organometal compounds (zinc naphthenate, zinc stearate, zinc 2-ethyloctoate, iron 2-ethylhexoate, cobalt 2-ethylhexoate, manganese 2-ethylhexoate, cobalt naphthenate, alkoxyaluminum compounds and the like), aminoalkyl group-substituted alkoxysilanes (3-aminopropyltriethoxysilane, N-β(aminoethyl)γ-aminopropyltrimethoxysilane and the like), amine compounds or salts thereof (hexylamine, dodecylamine phosphate and the like), quaternary ammonium salts (benzyltriethylammonium acetate and the like), lower fatty acid salts of alkali metals (lower fatty acid salts of alkali metals of potassium acetate, sodium acetate, lithium oxalate and the like), dialkylhydroxylamines (dimethylhydroxylamine, diethylhydroxylamine and the like), and silanes or siloxanes having a guanidyl group (tetramethylguanidylpropyltrimethoxysilane, tetramethylguanidylpropylmethyldimethoxysilane, tetramethylguanidylpropyltris(trimethylsiloxy)silane and the like). One of these compounds, or a mixture of two or more of these compounds may be used. The amount of the curing catalyst blended is preferably within the range of 0 to 20 parts by mass, further preferably within the range of 0.001 to 10 parts by mass, and furthermore preferably within the range of 0.01 to 5 parts by mass, based on 100 parts by mass of the component (2-1-6).

(2-1-9) Filler

A filler is not essential, but can be suitably used for reinforcement or the like. Examples of the filler include reinforcing agents (fumed silica, precipitated silica, such silica whose surface has been hydrophobized with an organosilicon compound, quartz powder, talc, zeolite, bentonite and the like), fibrous fillers (asbestos, glass fibers, organic fibers and the like), and basic fillers (calcium carbonate, zinc carbonate, zinc oxide, magnesium oxide, celite and the like). Among them, silica, calcium carbonate and zeolite are preferably used, and fumed silica having a hydrophobized surface, and calcium carbonate are further preferably used. The amount of the filler blended can be selected according to the purpose and the type of filler, and is within the range of 1 to 90% by volume, and preferably within the range of 5 to 60% by volume, based on the amount of the component (2-1-6).

(2-1-10) Adhesiveness-Imparting Component

An adhesiveness-imparting component is not essential, but can be suitably used. Examples of the adhesiveness-imparting component include amino group-containing organoalkoxysilanes (γ-aminopropyltrimethoxysilane, γ-(2-aminoethyl)aminopropyltrimethoxysilane and the like), epoxy group-containing organoalkoxysilanes (γ-glycidoxypropyltrimethoxysilane and the like), mercapto-containing organoalkoxysilanes (γ-mercapto propyltrimethoxysilane and the like), and reaction mixtures of amino group-containing organoalkoxysilanes and epoxy group-containing organoalkoxysilanes. The amount of the adhesiveness-imparting component blended is preferably within the range of 0.1 to 5 parts by mass based on 100 parts by mass of the component (2-1-6).

The silicone rubber compound that is a raw material before curing the silicone rubber has a plasticity number of preferably 100 to 400. When the plasticity number of the silicone rubber compound is set within this range, the compound can be inhibited from deforming under its own weight before curing. In this embodiment, the term "plasticity number" refers to a Williams plasticity number at 25° C. The Williams plasticity number is measured in accordance with the measurement method specified in JIS K 6249, "Method for Testing Uncured and Cured Silicone Rubbers" using a parallel plate plastometer (Williams Plastometer). In addition, the silicone rubber may be appropriately adjusted in adhesive strength to galvanized sheet steel according to the type of usage of the anticorrosion structure 6. For example, in addition to the anticorrosion of the bolt 2 and the nut 3, if the anticorrosion member 1 is desired to be easily removed in retightening the bolt 2 and the nut 3, it is preferable to adjust the adhesive strength to make at least the anticorrosion member 1 removable. Alternatively, in addition to the anticorrosion of the bolt 2 and the nut 3, if the bolt 2 is desired to be prevented from rotating and falling, it is preferable to adjust the adhesive strength to be higher to obtain more strong adhesion between the bolt 2 and the silicone rubber. The adhesion strength may be adjusted by blending metal soap such as zinc stearate with the silicone rubber in the main body 10.

(3) Coating Layer

The coating layer 20 is a layer that is formed of a silicone rubber and coats the connection surface 50. In the coating layer 20, a hole 7 into which the connecting part using the bolt 2 and the nut 3 can be inserted is preferably formed. In other words, the coating layer 20 is a layer coating a region of the connection surface 50 excluding the connecting part. The hole 7 may be, however, not formed. The silicone rubber contained in the coating layer 20 is a rubber-like elastic body obtained by curing a curable organopolysiloxane composition containing an organopolysiloxane as a main agent (silicone rubber compound) similar to the main body 10 described above. The silicone rubber compound that is a raw material before curing the silicone rubber has a plasticity number of preferably 100 to 600. The coating layer 20 has a thickness of preferably 0.5 to 3.5 mm, and more preferably 1.0 to 2.0 mm. The curable organopolysiloxane composition that is a raw material before curing the silicone rubber contained in the coating layer 20 is the same as the curable organopolysiloxane composition that is a raw material before curing the silicone rubber contained in the main body 10 excluding the plasticity number, and therefore is not described in detail here.

The anticorrosion structure 6 thus configured includes the anticorrosion member 1 formed of the silicone rubber excellent in heat resistance, water resistance, weather resistance, electrical insulation and the like, and therefore, as compared with a case where an anticorrosion member formed of vinyl chloride, an epoxy resin or the like is included, the durability of the anticorrosion effect can be improved. Since the connection surface 50 is coated with the coating layer 20 in the anticorrosion structure 6, rusting of the connection surface 50 caused by, for example, rainwater entering through a gap between the connection surface 50 of the structure 5 and the connecting part can be inhibited. In addition, in the anticorrosion member 1, the main body 10 formed of the silicone rubber is attached onto the coating layer 20 formed of the silicone rubber, and therefore, rigid adhesion via silicones can be obtained, which can further improve the durability.

Second Embodiment

Next, an anticorrosion structure according to a second embodiment will be described. Portions common to those used in the above-described embodiment are given the same symbols to avoid redundant description.

Figure 2:
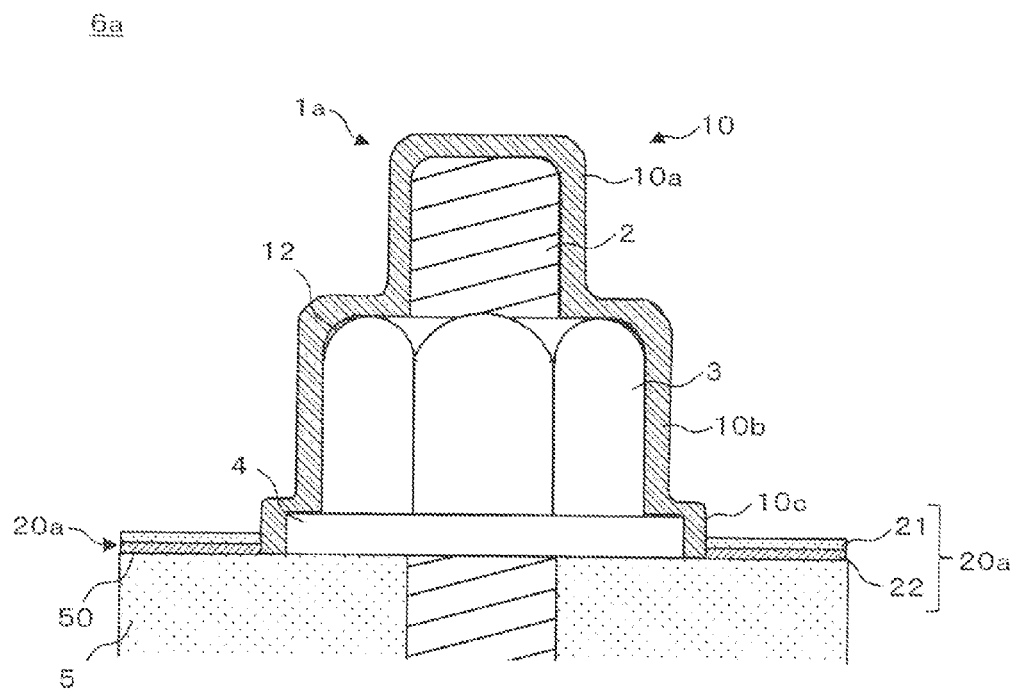
FIG. 2 shows a vertical cross-sectional view of an anticorrosion structure according to a second embodiment.

FIG. 2 shows a vertical cross-sectional view of the anticorrosion structure of the second embodiment.

The anticorrosion structure 6a of the second embodiment has a similar structure to the anticorrosion structure 6 of the first embodiment, but is different from the anticorrosion structure 6 of the first embodiment in that an anticorrosion member 1a is provided instead of the anticorrosion member 1. The anticorrosion structure 6a is the same in the configuration as the anticorrosion structure 6 of the first embodiment excluding the anticorrosion member 1a, and therefore detailed description thereof is herein omitted.

The anticorrosion member 1a is different from the anticorrosion member 1 of the first embodiment in that a coating layer 20a is formed instead of the coating layer 20. The coating layer 20a preferably includes an adhesion layer 22 at least on the side of the connection surface 50. In other words, the coating layer 20 preferably includes a base layer 21 formed of a silicone rubber, and an adhesion layer 22 formed of a silicone gel. The coating layer 20 is formed from, for example, a silicone adhesive sheet including the base layer 21 and the adhesion layer 22. In the base layer 21 and the adhesion layer 22, a hole 7a through which the connecting part using the bolt 2 and the nut 3 can be inserted is preferably formed in the same manner as in the coating layer 20 of the first embodiment. The hole 7a, however, may not be formed. The silicone rubber contained in the base layer 21 is the same in the configuration as the silicone rubber contained in the coating layer 20 of the first embodiment, and therefore, the detailed description thereof is herein omitted. The base layer 21 has a thickness of preferably 0.1 to 1.5 mm, and more preferably 0.5 to 0.8 mm. The adhesion layer 22 has a thickness of preferably 0.5 to 2.0 mm, and more preferably 0.8 to 1.2 mm. The anticorrosion member 1a is the same in the configuration as the anticorrosion member 1 of the first embodiment excluding the coating layer 20a, and therefore, the detailed description thereof is herein omitted.

The anticorrosion structure 6a thus configured also exhibits the same effects as the anticorrosion structure 6 of the first embodiment. Since the coating layer 20a includes the adhesion layer 22 on the side of the connection surface 50, adhesion between the coating layer 20a and the connection surface 50 can be made strong, which can further improve the durability. In addition, in the anticorrosion member 1a, the main body 10 formed of the silicone rubber is attached onto the base layer 21 formed of the silicone rubber, and therefore, rigid adhesion via silicones can be obtained, which can further improve the durability.

2. Method for Producing Anticorrosion Structure

Preferred embodiments of a suitable method for producing an anticorrosion structure of the present embodiment will now be described.

First Embodiment

Figure 3:
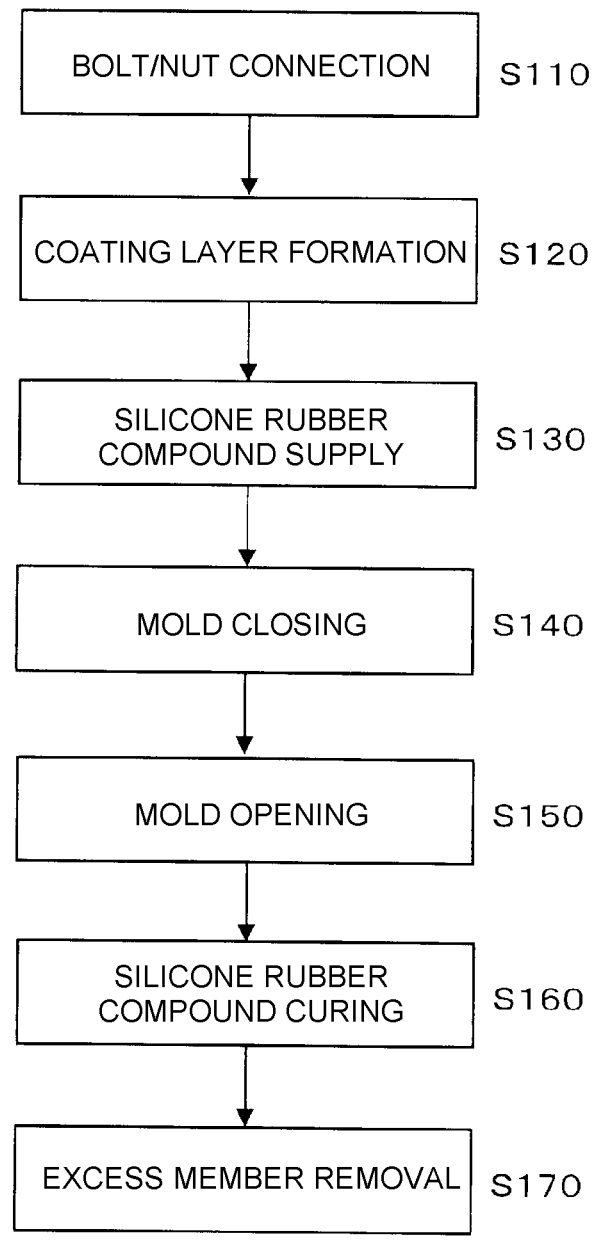
FIG. 3 shows a flowchart of main procedures in a method for producing the anticorrosion structures according to the first and second embodiment.

FIG. 3 shows a flowchart of main procedures in a method for producing the anticorrosion structures according to the first and second embodiments. FIGS. 4A to 7H show diagrams for illustrating production procedures of the anticorrosion structure of the first embodiment. FIGS. 4A to 7H show views of the production procedures of the anticorrosion structure taken in the same direction as in FIG. 1.

The method for producing an anticorrosion structure of this embodiment is an example of the method for producing the anticorrosion structure 6 of the first embodiment described above. The method for producing an anticorrosion structure of this embodiment includes a bolt/nut connecting step (S110), a coating layer forming step (S120), a supplying step (S130), a mold closing step (S140), a mold opening step (S150), a curing step (S160), and an excess member removing step (S170). Now, the respective steps will be described.

2.1 Bolt/Nut Connecting Step (S110)

Figure 4A:
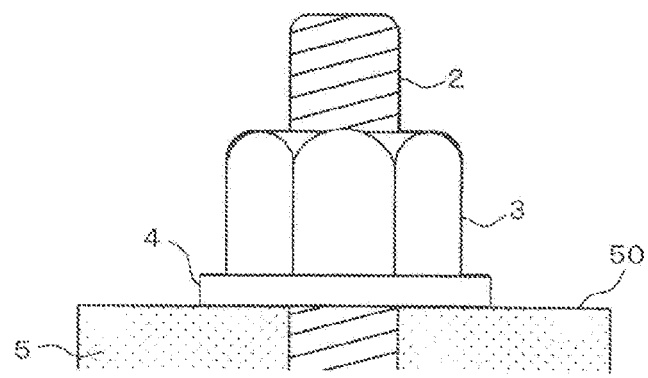
FIGS. 4A to 4C show diagrams for illustrating production procedures of the anticorrosion structure of the first embodiment.

The bolt/nut connecting step is a step of performing connection using the bolt 2 and the nut 3 on the connection surface 50 of the structure 5 (see FIG. 4A). In the bolt/nut connecting step, the connection using the bolt 2 and the nut 3 is performed by inserting the bolt 2 preferably in a state of the washer 4 being disposed between the connection surface 50 and the nut 3.

2.2 Coating Layer Forming Step (S120)

Figure 4B:
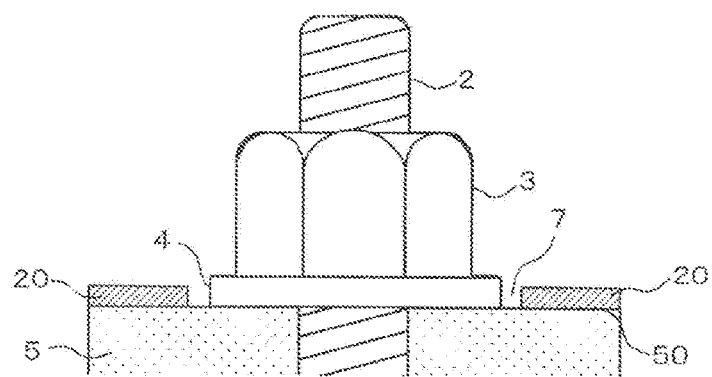

The coating layer forming step is a step of forming the coating layer 20 by coating the connection surface 50 with the silicone rubber (see FIG. 4B). In the coating layer forming step, the connection surface 50 is preferably coated with a silicone rubber sheet formed of a silicone rubber obtained by curing a silicone rubber compound having a plasticity number of 100 to 600. In the silicone rubber sheet, the hole 7 through which the connecting part of the bolt 2 and the nut 3 can be inserted is preferably formed.

2.3 Supplying Step (S130)

Figure 4C:
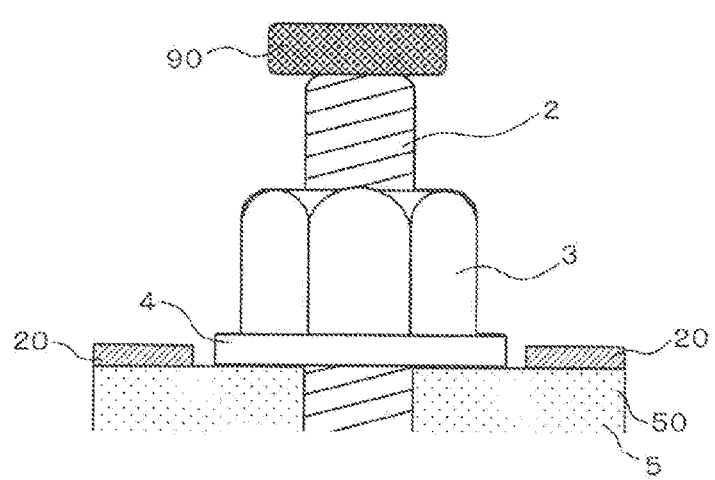

The supplying step is a step of supplying the silicone rubber compound 90 for coating the portion, protruding beyond the connection surface 50, of the connecting part using the bolt 2 and the nut 3 (see FIG. 4C). More specifically, in the supplying step, the silicone rubber compound 90 having a plasticity number of 100 to 400 is supplied to the leg tip of the bolt 2. In this embodiment, the silicone rubber compound 90 is preferably a semi-solid (also referred to as semi-cured) moisture-curable composition. In the supplying step, a lump of the semi-solid silicone rubber compound is preferably supplied to the leg tip of the bolt 2. In a state of the semi-solid silicone rubber compound 90 being thus supplied, when a mold 80 is overlaid in the mold closing step (S140) described below, the portion protruding beyond the connection surface 50 is coated. In the supplying step, the supply position of the semi-solid silicone rubber compound 90 is not limited to the leg tip of the bolt 2, but may be a portion excluding the leg tip of the bolt 2 in the portion protruding beyond the connection surface 50, or may be an entire outer peripheral surface of the portion protruding beyond the connection surface 50. The supplying step (S130) and the mold closing step (S140) correspond to an example of a coating step of the present invention.

2.4 Mold Closing Step (S140)

Figure 5D:
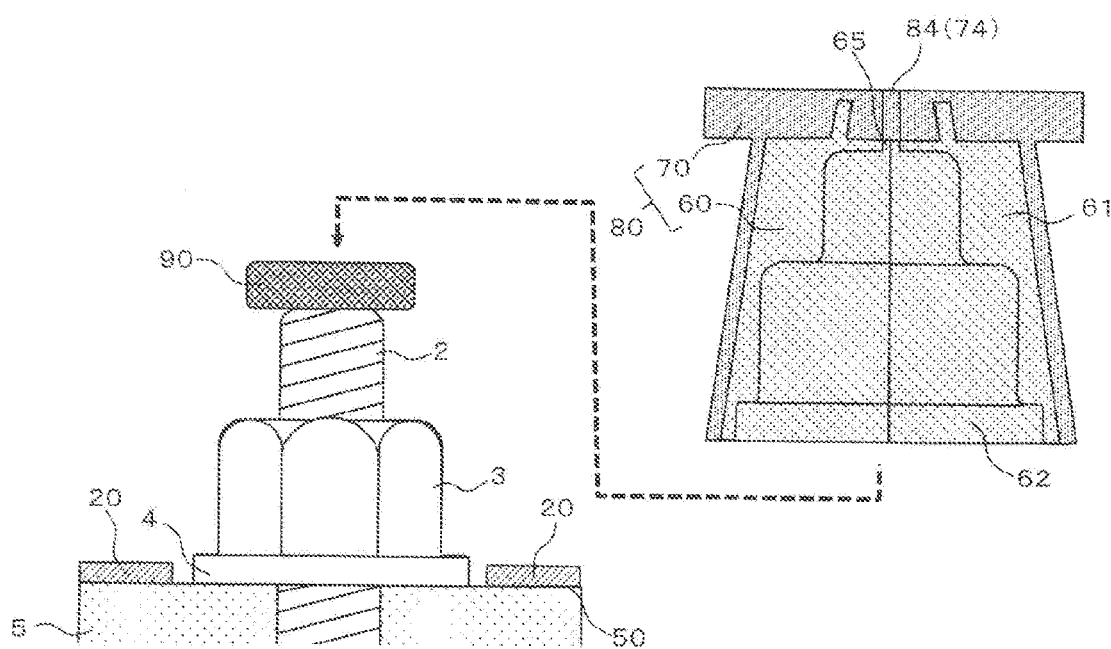
FIGS. 5D and 5E show diagrams for illustrating production procedures of the anticorrosion structure of the first embodiment.

The mold closing step is a step of closing the mold 80 with the mold 80 set to cover the portion, protruding beyond the connection surface 50, of the connecting part of the bolt/nut connection (see FIG. 5D). More specifically, in the mold closing step, the mold 80 is overlaid to cover the silicone rubber compound 90 having been supplied in the supplying step (S130), and the mold 80 is closed. The mold 80 is a mold covering the portion of the connecting part protruding beyond the connection surface 50. The mold 80 preferably has an opening 84 opened on the side of the leg tip of the bolt (see FIG. 5D). The mold 80 preferably includes an inner mold 60 that covers the portion of the connecting part protruding beyond the connection surface 50 and is separable into two or more pieces, and an outer mold 70 covering the inner mold 60 (see FIG. 6F).

The inner mold 60 is a mold closable in the left-right direction, and includes a left mold 60a and a right mold 60b. The closing direction is, however, not limited to the left-right direction as in FIG. 6F, but may be, for example, in the up-down direction instead of the left-right direction or in addition to the left-right direction. The left mold 60a includes a left main body 61a, a left recess portion 62a, and a left opening 64a. The right mold 60b includes a right main body 61b, a right recess portion 62b, and a right opening 64b. The inner mold 60 includes, through the connection between the left mold 60a and the right mold 60b, an inner main body 61, an inner recess portion 62, and an inner opening 64 (see FIG. 5D). The inner recess portion 62 is a recess where the portion of the connecting part protruding beyond the connection surface 50 is to be disposed. The inner opening 64 is a region formed through the connection between the left opening 64a and the right opening 64b, and is opened on the side of the leg tip of the bolt 2, and has a through hole 65 penetrating to the inner recess portion 62.

Figure 6F:
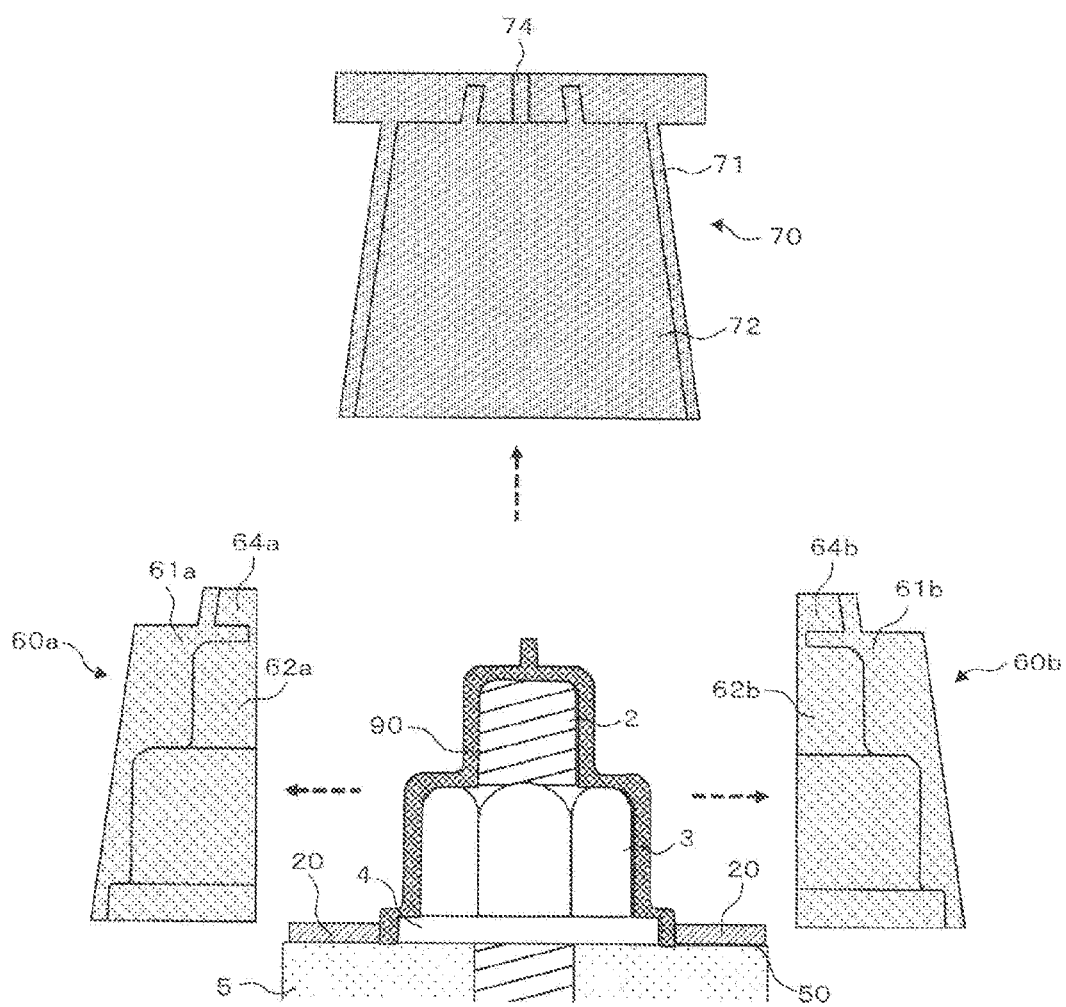
FIG. 6F shows a diagram for illustrating production procedures of the anticorrosion structure of the first embodiment.

The outer mold 70 is one mold covering the inner mold 60, and includes an outer main body 71, an outer recess portion 72, and an outer opening 74 (see FIG. 6F). The outer recess portion 72 is a recess in which the inner mold 60 is to be disposed. The outer opening 74 is an opening penetrating to the outer recess portion 72, and communicates with the through hole 65 of the inner mold 60 to form the opening 84 when the outer mold 70 is set to cover the inner mold 60 (see FIG. 5D).

Figure 5E:
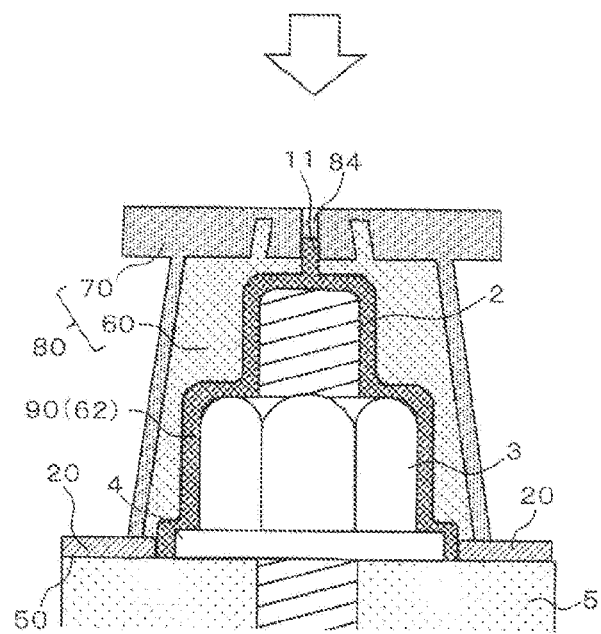

In the mold closing step, the mold 80 in which the outer mold 70 is set to cover the inner mold 60 is overlaid in such a manner as to push the silicone rubber compound 90 inward, and thus, the mold 80 is closed (see FIGS. 5D and 5E). When mold closing is thus performed, a gap surrounded by the inner mold 60, the bolt 2, the nut 3, and the washer 4 is formed. This gap is a gap for forming the anticorrosion member 1 therein, and communicates with the opening 84. In this embodiment, the semi-solid silicone rubber compound 90 having been supplied to the leg tip of the bolt 2 in the supplying step (S130) is filled in the gap by the mold closing. An excess portion of the silicone rubber compound 90 that has been supplied in the supplying step (S130) but has not been filled in the gap is discharged to the opening 84. In other words, the opening 84 is a portion for discharging the excess portion of the silicone rubber compound 90 not filled in the gap. The opening 84 is in a substantially cylindrical shape, but may be in any other shape as long as the excess portion of the silicone rubber compound 90 can be discharged thereto. In addition, the mold 80 is not particularly limited in the shape as long as the gap for forming the anticorrosion member 1 can be formed. In the mold closing step, the mold 80 may be closed by overlaying the inner mold 60 to push the silicone rubber compound 90 inward, and then setting the outer mold 70 to be overlaid to cover the inner mold 60.

2.5 Mold Opening Step (S150)

The mold opening step is a step of opening the mold 80 (see FIG. 6F). More specifically, in the mold opening step, the outer mold 70 is first removed, and then the inner mold 60 is opened in the left-right direction. At this point, the silicone rubber compound 90 covering the outer circumferences of the bolt 2 and the nut 3 is in a semi-solid state. In this embodiment, since the silicone rubber compound 90 has a plasticity number of 100 to 400, the silicone rubber compound 90 can be inhibited from deforming under its own weight even if the mold 80 is opened when it is in the semi-solid state before curing.

2.6 Curing Step (S160)

Figure 7G:
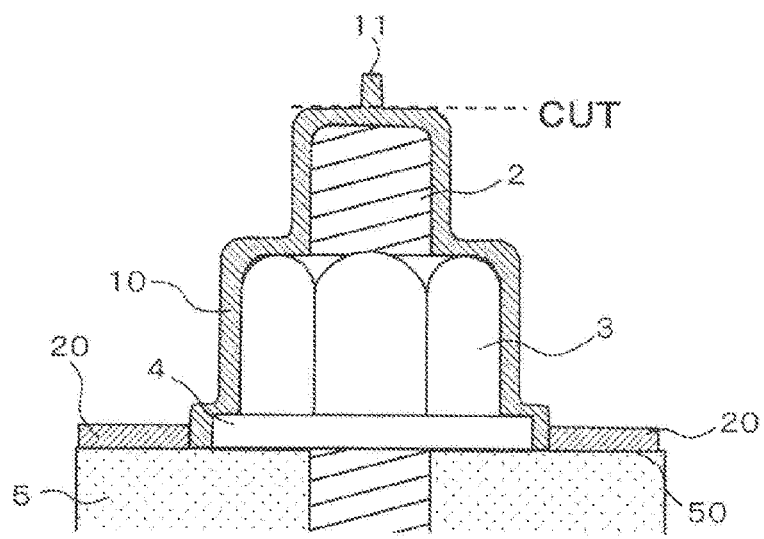
FIGS. 7G and 7H show diagrams for illustrating production procedures of the anticorrosion structure of the first embodiment.
Figure 7G:
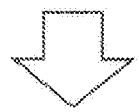

The curing step is a step of curing the silicone rubber compound (see FIG. 7G). In the curing step, the silicone rubber compound 90 coating the portion protruding beyond the connection surface 50 in the supplying step (S130) and the mold closing step (S140) is preferably cured. Curing conditions vary depending on the type of the silicone rubber compound. For example, when an addition-curing type curable organopolysiloxane composition is used, the curing step is performed at preferably 80 to 150° C., and more preferably 90 to 120° C. The curing step may be performed, further as post curing, at a higher temperature of preferably 180 to 250° C., and more preferably 190 to 220° C. When a two-component addition-reaction type curable organopolysiloxane composition is used, the curing step can be performed at room temperature (20 to 30° C.). When a condensation reaction type curable organopolysiloxane composition is used, the curing step is usually performed at room temperature (20 to 30° C.). When a UV curing type or electron beam curing type curable organopolysiloxane composition is used, the silicone rubber can be obtained by irradiating the inside of the mold 80 holding the mixture therein with UV or electron beam. As a result, the main body 10 and the coating layer 20 of the anticorrosion member 1, and an excess member 11 are formed. The excess member 11 is a member formed of the excess portion of the silicone rubber compound 90 not filled in the gap surrounded by the inner mold 60, the bolt 2, the nut 3, and the washer 4, and is a member protruding from the main body 10 toward the opening 84.

2.7 Excess Member Removing Step (S170)

Figure 7H:
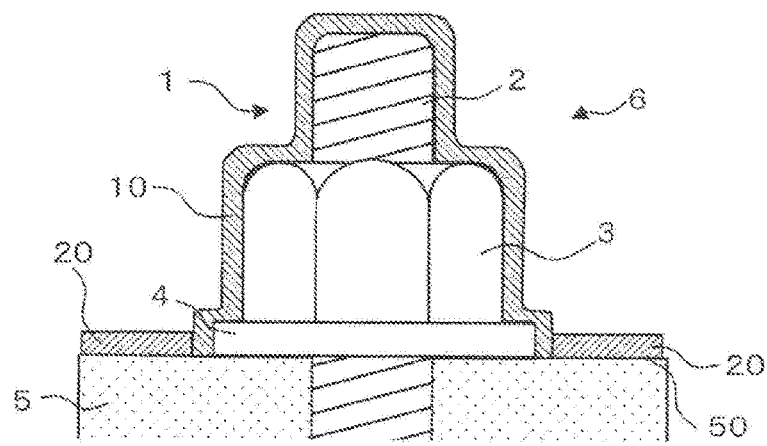
Figure 8A:
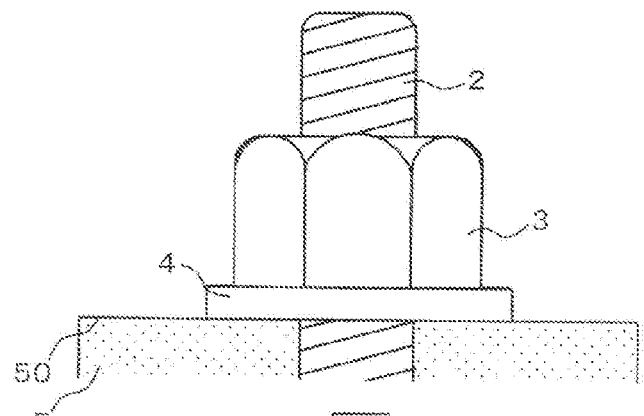
FIGS. 8A, 8I and 8J show diagrams for illustrating production procedures of the anticorrosion structure of the second embodiment.
Figure 8I:
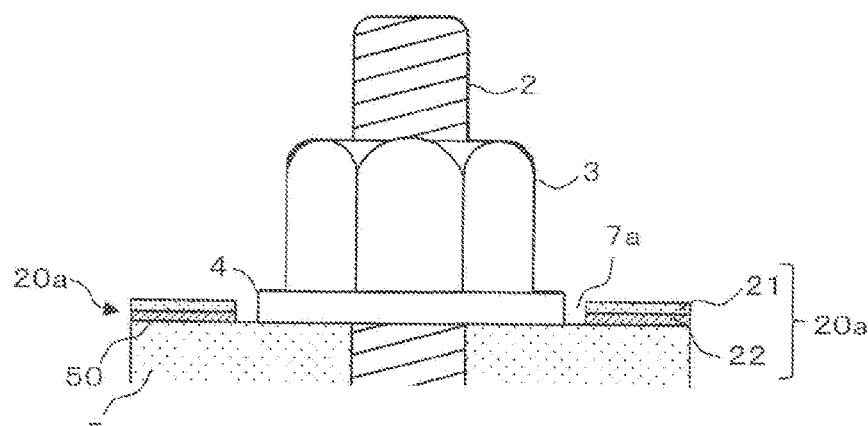
Figure 8J:
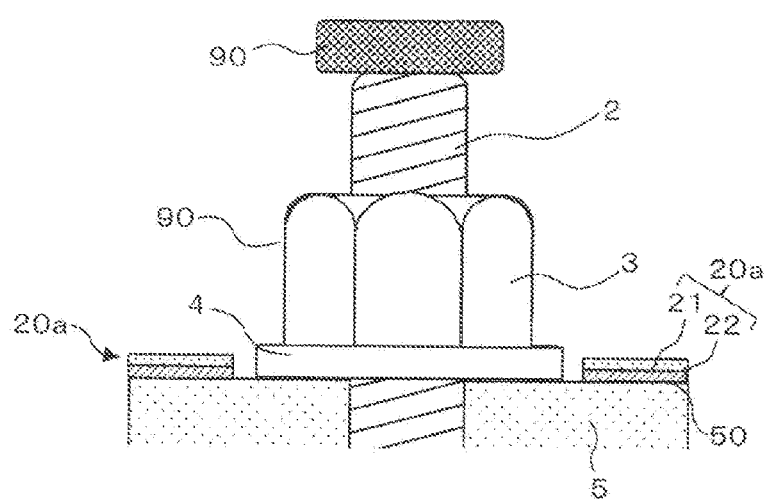
Figure 9K:
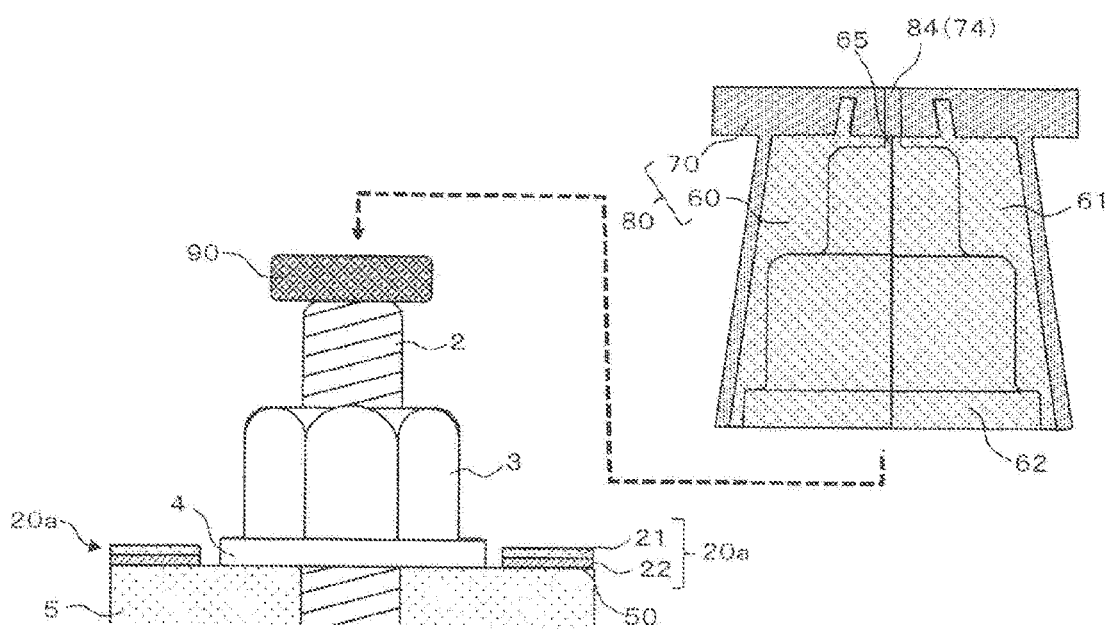
FIGS. 9K and 9L show diagrams for illustrating production procedures of the anticorrosion structure of the second embodiment.
Figure 9L:
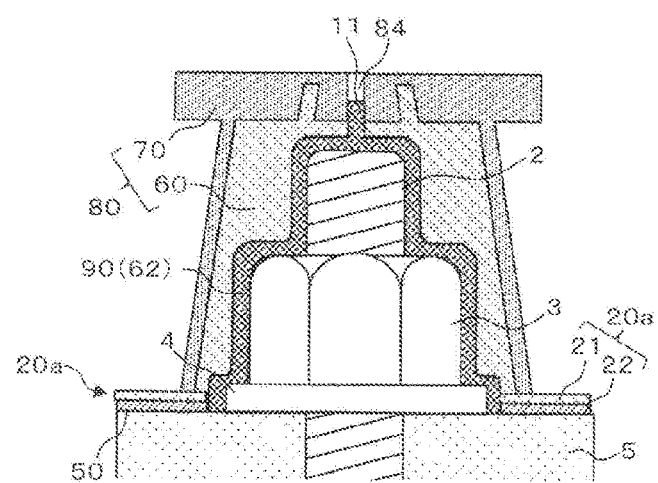
Figure 10M:
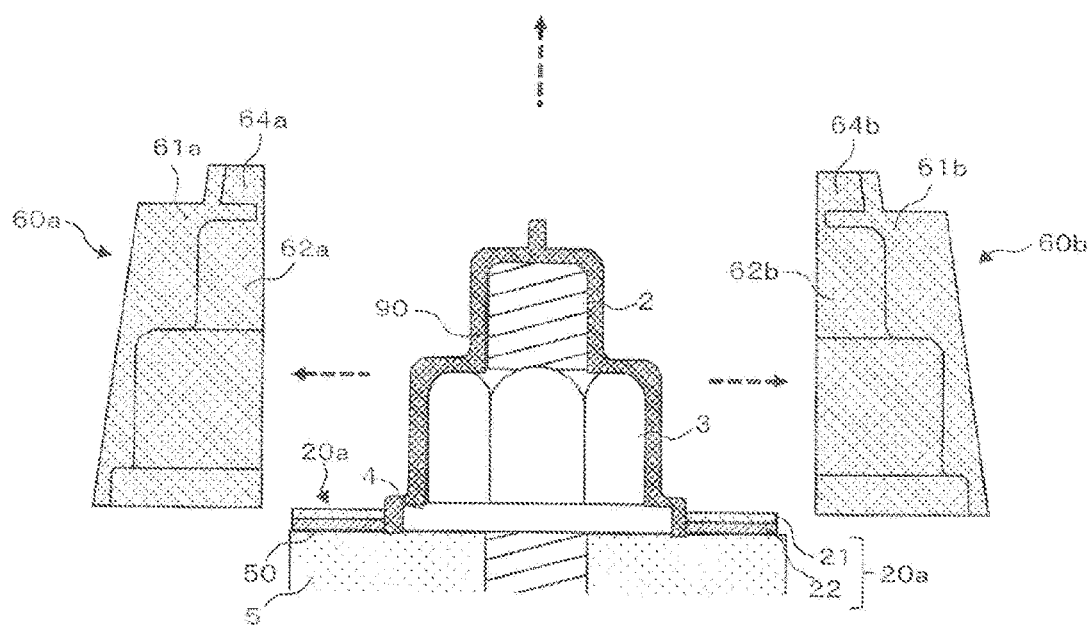
FIG. 10M shows a diagram for illustrating production procedures of the anticorrosion structure of the second embodiment.
Figure 11N:
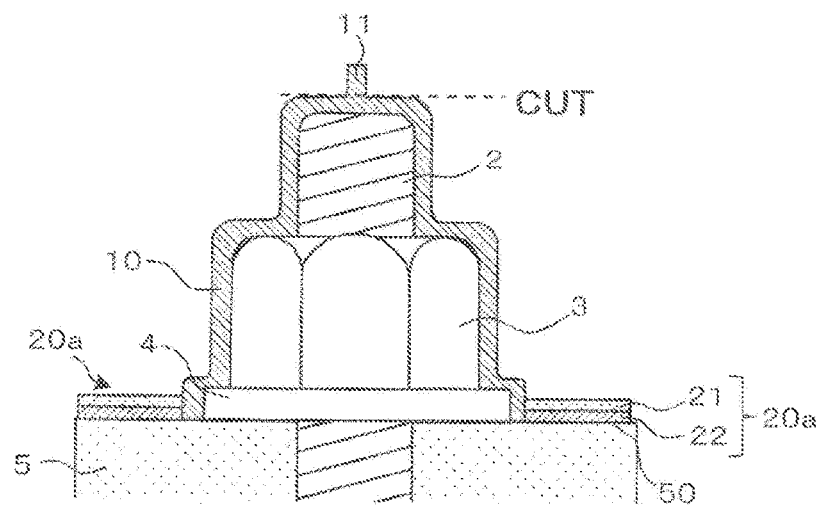
FIGS. 11N and 11O show diagrams for illustrating production procedures of the anticorrosion structure of the second embodiment.
Figure 11O:
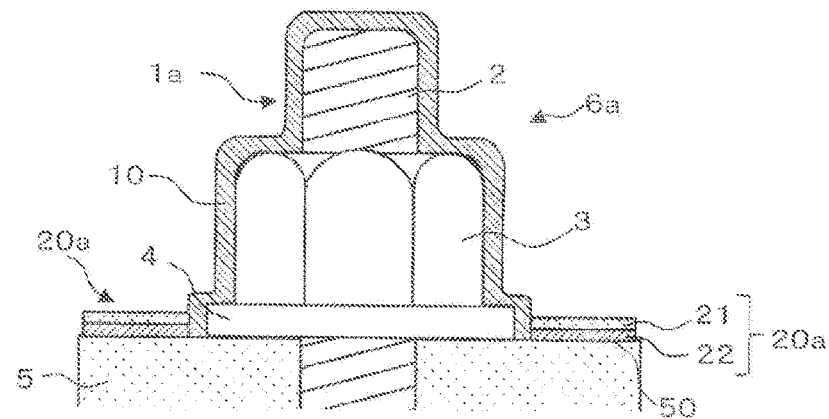

The excess member removing step is a step of removing the excess member 11 (see FIGS. 7G and 7H). As a method for removing the excess member 11, for example, the excess member 11 may be mechanically cut, or the excess member 11 may be removed by polishing the surface thereof.

The anticorrosion structure 6 produced in this manner is formed of the silicone rubber excellent in heat resistance, water resistance, weather resistance, electrical insulation and the like, and further has the connection surface 50 coated with the coating layer 20, and therefore, durability of the anticorrosion effect can be improved. Besides, since the silicone rubber compound having a plasticity number of 100 to 400 is used, the silicone rubber compound can be inhibited from deforming under its own weight. Accordingly, the mold 80 can be opened when the silicone rubber compound is in a semi-solid state before curing, and thus the production of another anticorrosion structure 6 can be started with the mold 80, and therefore, there is no need to use a large number of molds 80, and working time can be reduced.

Second Embodiment

Next, a second embodiment of the suitable method for producing an anticorrosion structure of the embodiment of the present invention will be described. Portions common to those used in the above-described embodiment are given the same symbols to avoid redundant description.

FIGS. 8A to 11O show diagrams for illustrating production procedures of the anticorrosion structure of the second embodiment. It is noted that FIGS. 8A to 11O show views of the production procedures of the anticorrosion structure taken in the same direction as in FIG. 2.

The production method of this embodiment is an example of a method for producing the anticorrosion structure 6a of the second embodiment described above. The method for producing an anticorrosion structure of this embodiment is different from the production method of the first embodiment in that the coating layer 20a is formed instead of the coating layer 20, but is the same as the production method of the first embodiment in the other configurations and the procedures of the production method. In other words, the method for producing an anticorrosion structure of this embodiment includes, in the same manner as in the first embodiment, the bolt/nut connecting step (S110), the coating layer forming step (S120), the supplying step (S130), the mold closing step (S140), the mold opening step (S150), the curing step (S160), and the excess member removing step (S170) (see FIG. 3).

First, the bolt/nut connecting step (S110) is performed in the same manner as in the first embodiment. Next, in the coating layer forming step (S120), the coating layer 20a coating the connection surface 50 is formed with a silicone rubber sheet including the adhesion layer 22 (see FIG. 8I). In the coating layer forming step (S120), the coating layer 20a is preferably formed by adhering, onto the connection surface 50, a silicone adhesive sheet composed of the base layer 21 and the adhesion layer 22 with the adhesion layer 22 disposed on the side of the connection surface 50. In the silicone adhesive sheet, the hole 7a through which the connecting part of the bolt 2 and the nut 3 can be inserted is preferably formed in the same manner as in the silicone rubber sheet used for forming the coating layer 20 of the first embodiment.

Then, in the same manner as in the first embodiment described above, the supplying step (S130), the mold closing step (S140), the mold opening step (S150), the curing step (S160), and the excess member removing step (S170) are executed to produce the anticorrosion structure 6a (see FIGS. 8J and 9K to 11O).

In the anticorrosion structure 6a produced in this manner, the durability of the anticorrosion effect can be improved in the same manner as in the anticorrosion structure 6. Besides, since the silicone rubber compound having a plasticity number of 100 to 400 is used, the mold 80 can be opened when the silicone rubber compound is in a semi-solid state before curing, and therefore, there is no need to use a large number of molds 80, and working time can be reduced. In addition, in the anticorrosion structure 6a, the coating layer 20a can be easily formed by adhering the silicone adhesive sheet onto the connection surface 50, and therefore, the durability can be further improved.

Third Embodiment

Next, a third embodiment of the suitable method for producing an anticorrosion structure of the embodiment of the present invention will be described. Portions common to those used in the above-described embodiments are given the same symbols to avoid redundant description.

Figure 12:
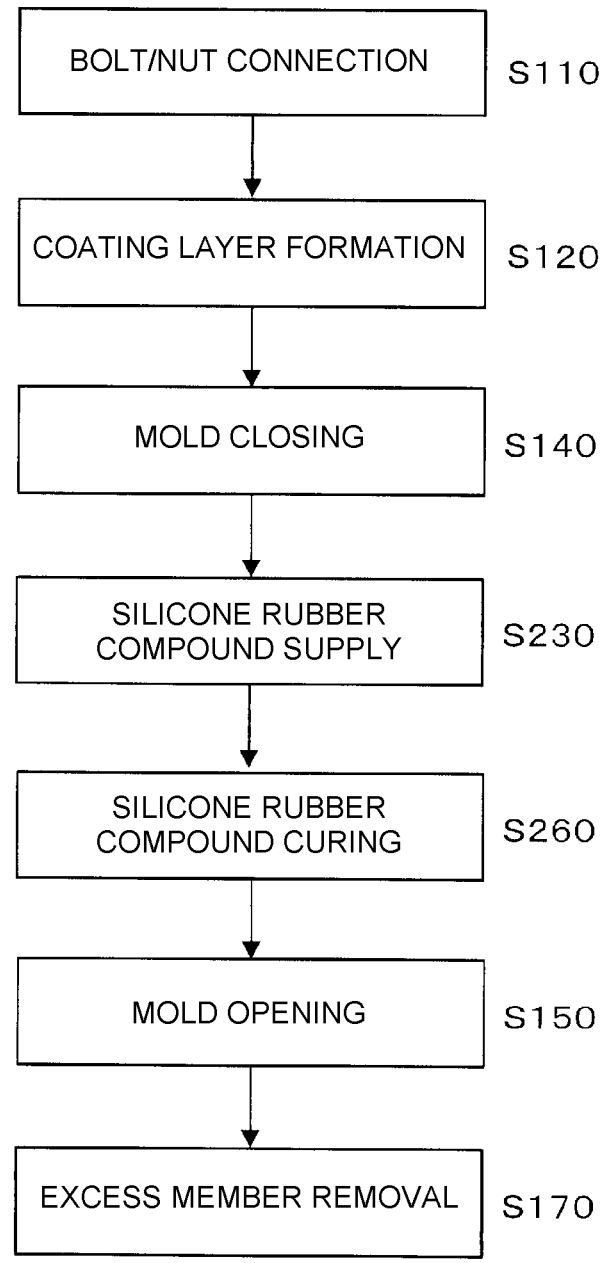
FIG. 12 shows a flowchart of main procedures in a method for producing an anticorrosion structure according to a third embodiment and a fourth embodiment.

FIG. 12 shows a flowchart of main procedures in a method for producing an anticorrosion structure according to the third embodiment and a fourth embodiment. FIGS. 13A to 16H show diagrams for illustrating production procedures of an anticorrosion structure of the third embodiment. FIGS. 13A to 16H show views of the production procedures of the anticorrosion structure taken in the same direction as in FIG. 1.

The method for producing an anticorrosion structure of this embodiment is an example of the method for producing the anticorrosion structure 6 of the first embodiment described above. The method for producing an anticorrosion structure of this embodiment includes the bolt/nut connecting step (S110), the coating layer forming step (S120), the mold closing step (S140), a supplying step (S230), a curing step (S260), the mold opening step (S150), and the excess member removing step (S170). The method for producing an anticorrosion structure of this embodiment is different from the production method of the first embodiment described above in that the supplying step (S230) is executed instead of the supplying step (S130) after the mold closing step (S140), and that the curing step (S260) is executed instead of the curing step (S160) before the mold opening step (S150), and is the same as the production method of the first embodiment in the other configurations and procedures of the production method.

Figure 13A:
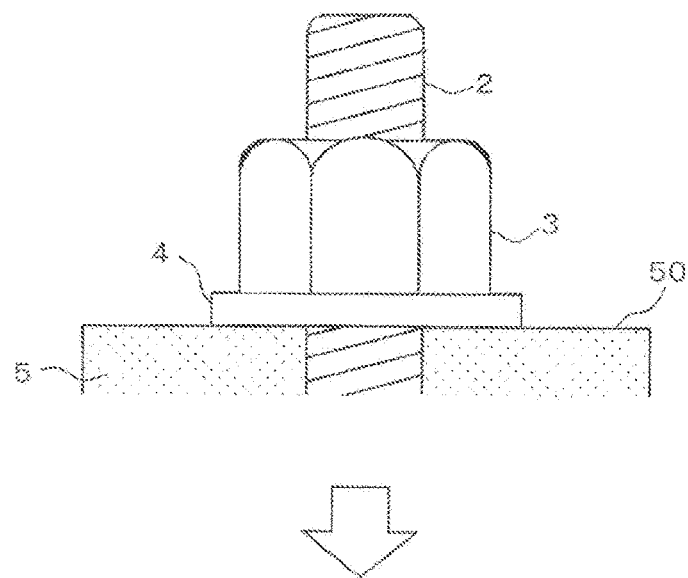
FIGS. 13A and 13B show as diagrams for illustrating production procedures of the anticorrosion structure of the third embodiment.
Figure 13B:
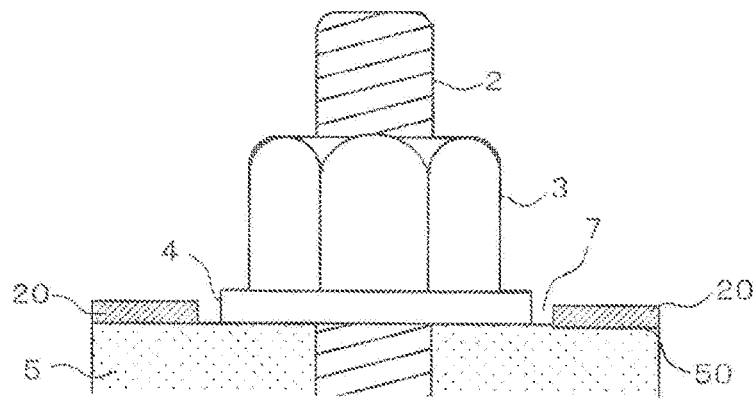
Figure 14P:
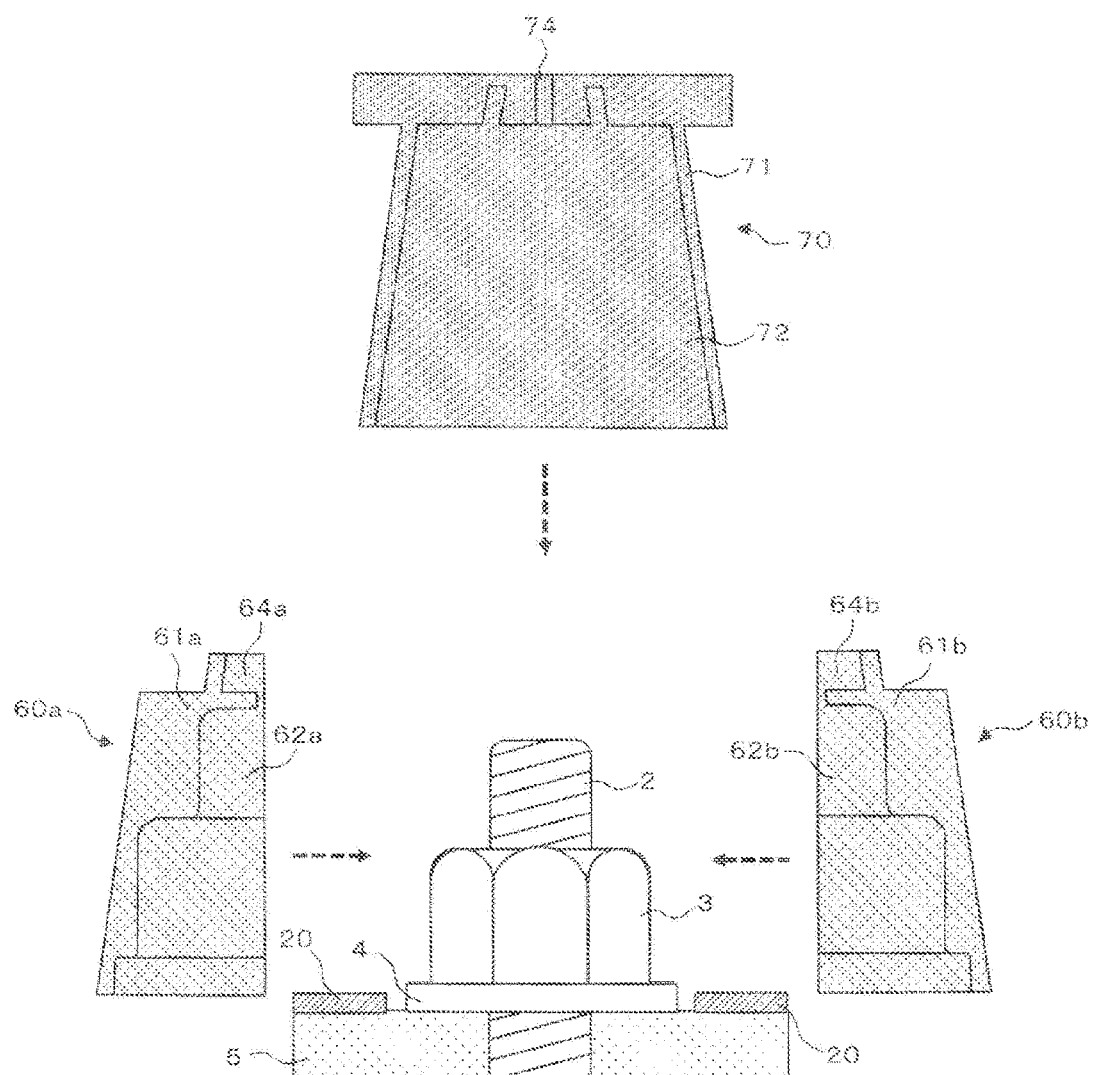
FIG. 14P shows a diagram for illustrating production procedures of the anticorrosion structure of the third embodiment.
Figure 15Q:
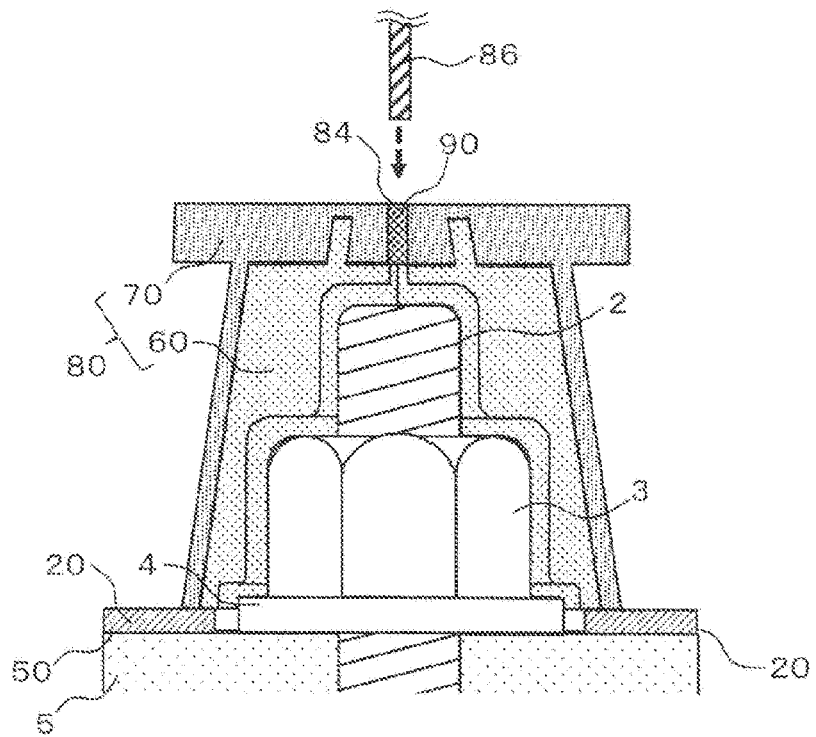
FIGS. 15Q and 15R show diagrams for illustrating production procedures of the anticorrosion structure of the third embodiment.
Figure 15Q:
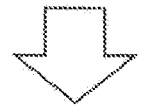
Figure 15R:
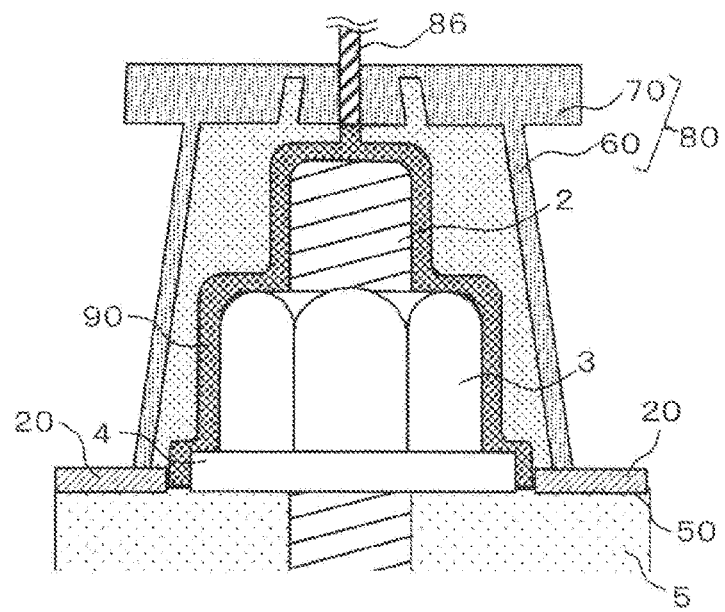
Figure 16S:
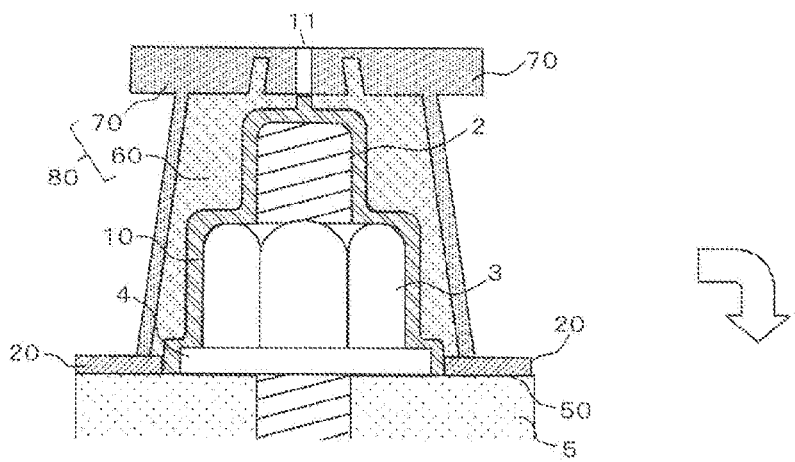
FIGS. 16S, 16G and 16H show diagrams for illustrating production procedures of the anticorrosion structure of the third embodiment.
Figure 16G:
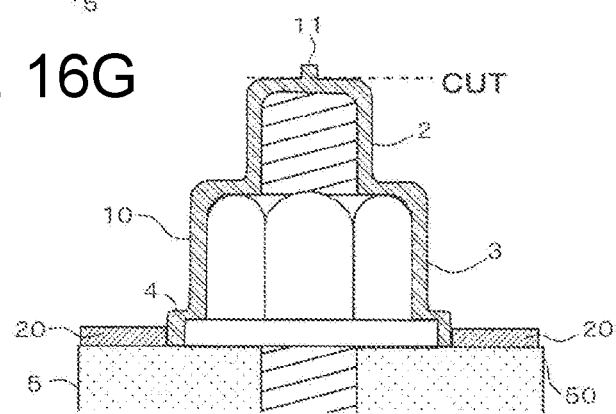
Figure 16H:
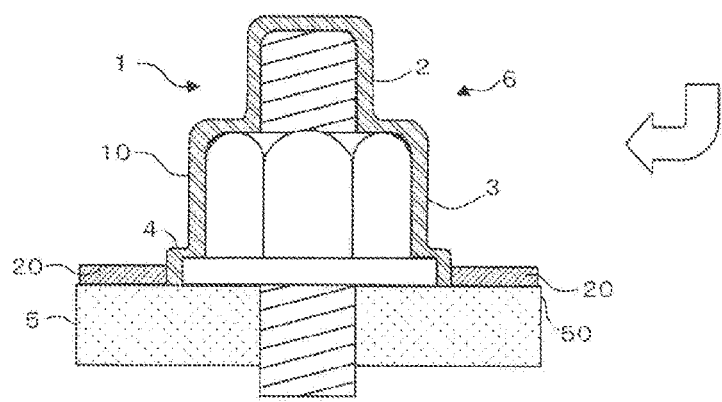

First, in the same manner as in the first embodiment described above, the bolt/nut connecting step (S110) and the coating layer forming step (S120) are executed (see FIGS. 13A and 13B). Next, in the mold closing step (S140), the mold 80 described above is set to cover the portion, protruding beyond the connection surface 50, of the connecting part of the bolt/nut connection, and the mold is closed (see FIG. 14P). In this embodiment, in the mold closing step, the inner mold 60 is first overlaid to cover the portion protruding beyond the connection surface 50, and the outer mold 70 is then overlaid to cover the inner mold 60, and thus, the mold 80 is set. In the mold closing step, the mold 80 in which the outer mold 70 is set to cover the inner mold 60 may be overlaid on the portion protruding beyond the connection surface 50 to be closed in the same manner as in the first embodiment described above. The mold 80 preferably has the opening 84 opened on the side of the leg tip of the bolt (see FIG. 15Q). In this embodiment, the opening 84 is a supply port (gate) through which the silicone rubber compound 90 to be formed into the main body 10 of the anticorrosion member 1 after curing is supplied into the mold 80 (inner mold 60). In this embodiment, the opening 84 is in a substantially cylindrical shape, but may be in any other shape as long as the silicone rubber compound 90 can be supplied into the mold 80 (inner mold 60) with a piston 86 described below. When the mold closing of the mold 80 is performed, a gap surrounded by the inner mold 60, the bolt 2, the nut 3, and the washer 4 is formed. This gap is a gap for forming the anticorrosion member 1 therein, and communicates with the opening 84.

Next, the supplying step (S230) is executed. The supplying step (S230) is a step of covering the portion, protruding beyond the connection surface 50, of the connecting part using the bolt 2 and the nut 3 with the silicone rubber compound 90 (see FIGS. 15Q and 15R). In this embodiment, the silicone rubber compound 90 is preferably a liquid silicone rubber. In the supplying step, the portion protruding beyond the connection surface 50 is coated with the silicone rubber compound 90 preferably with a pushing jig including the mold 80 described above, and the piston 86 for pushing the silicone rubber compound 90 in through the opening 84 of the mold 80. More specifically, in the supplying step (S230), the silicone rubber compound 90 is set at the leg tip of the bolt 2 (corresponding to the opening 84 in this embodiment), and an end of the piston 86 is applied to the silicone rubber compound 90 to push the silicone rubber compound 90 through the opening 84 toward the connection surface 50. Since the gap surrounded by the inner mold 60, the bolt 2, the nut 3 and the washer 4 communicates with the opening 84, the silicone rubber compound 90 can be supplied into the gap through the opening 84. In this manner, the silicone rubber compound 90 is filled in the gap, and the portion of the connecting part protruding beyond the connection surface 50 is coated with the silicone rubber compound 90. The piston 86 is not particularly limited as long as at least it is in a shape capable of pushing the silicone rubber compound into the gap formed in the mold 80. The mold closing step (S140) and the supplying step (S230) correspond to an example of the coating step of the present invention.

Then, the curing step (S260) is executed. The curing step is a step of curing the silicone rubber compound 90 (see FIG. 16S). In this embodiment, in the curing step, the silicone rubber compound 90 having been supplied in the supplying step (S230) is cured in a state of the mold 80 being set. Then, the mold opening step (S150) and the excess member removing step (S170) are executed, and thus, the anticorrosion structure 6 is produced (see FIGS. 16G and 16H). The excess member 11 formed in the curing step (S260) corresponds to a portion protruding from the main body 10 toward the opening 84, and is designated also as a gate member or a gate mark.

Also in the anticorrosion structure 6 produced in this manner, the durability of the anticorrosion effect can be improved in the same manner as in the anticorrosion structures 6 and 6a produced by the production methods of the above-described embodiments.

Fourth Embodiment

Next, a fourth embodiment of the suitable method for producing the anticorrosion structure of the embodiment of the present invention will be described. Portions common to those used in the above-described embodiments are given the same symbols to avoid redundant description.

FIGS. 17A to 20O show diagrams for illustrating production procedures of an anticorrosion structure according to the fourth embodiment. FIGS. 17A to 20O show views of the production procedures of the anticorrosion structure taken in the same direction as in FIG. 2.

The production method of this embodiment is an example of the method for producing the anticorrosion structure 6a of the second embodiment described above. The method for producing an anticorrosion structure of this embodiment is different from the production method of the third embodiment in that the coating layer 20a is formed instead of the coating layer 20, and is the same as the production method of the third embodiment in the other configurations and the procedures of the production method. In other words, the method for producing an anticorrosion structure of this embodiment includes, in the same manner as in the third embodiment, the bolt/nut connecting step (S110), the coating layer forming step (S120), the mold closing step (S140), the supplying step (S230), the curing step (S260), the mold opening step (S150), and the excess member removing step (S170) (see FIG. 12).

Figure 17A:
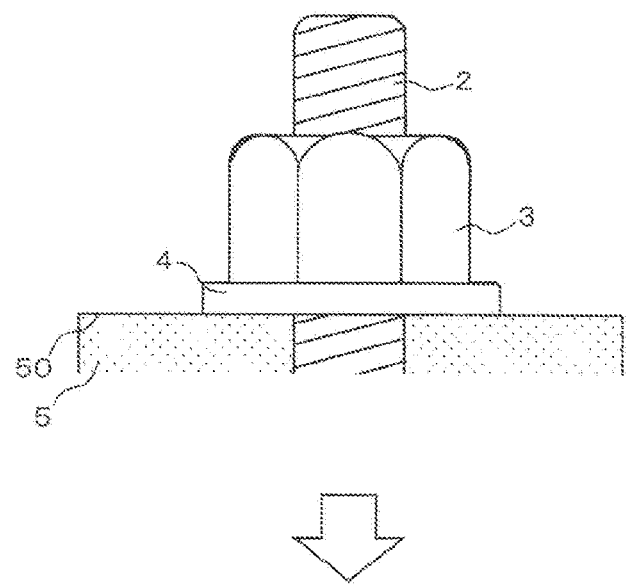
FIGS. 17A and 17I show diagrams for illustrating production procedures of the anticorrosion structure of the fourth embodiment.
Figure 17I:
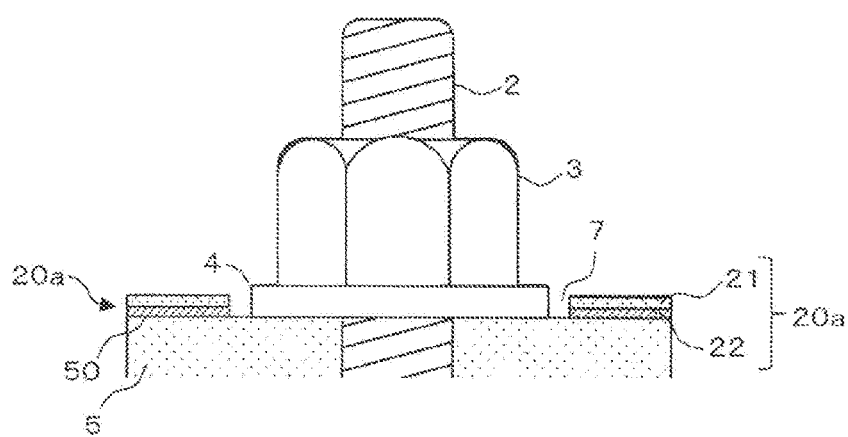
Figure 18T:
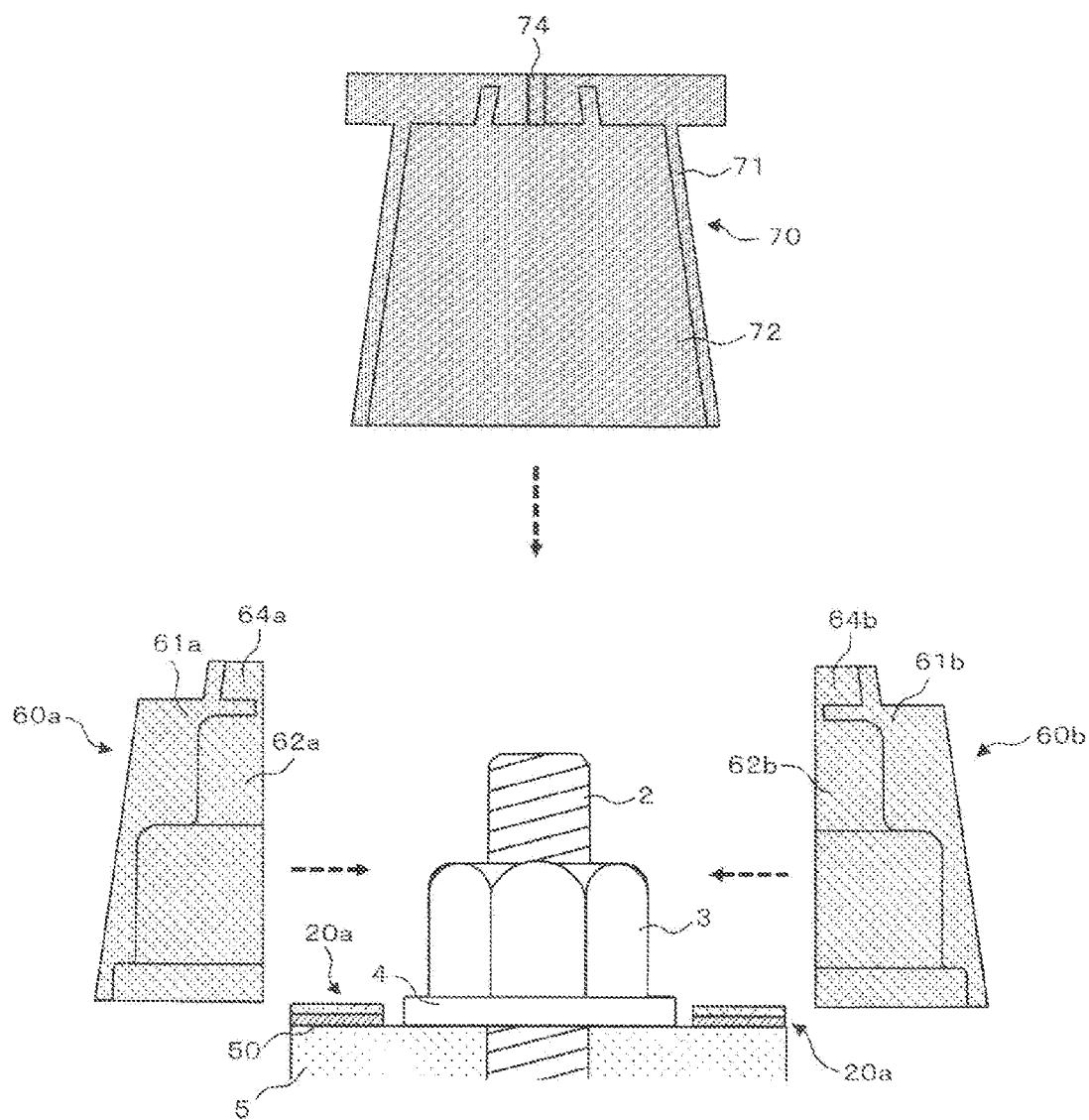
FIG. 18T shows a diagram for illustrating production procedures of the anticorrosion structure of the fourth embodiment.
Figure 19U:
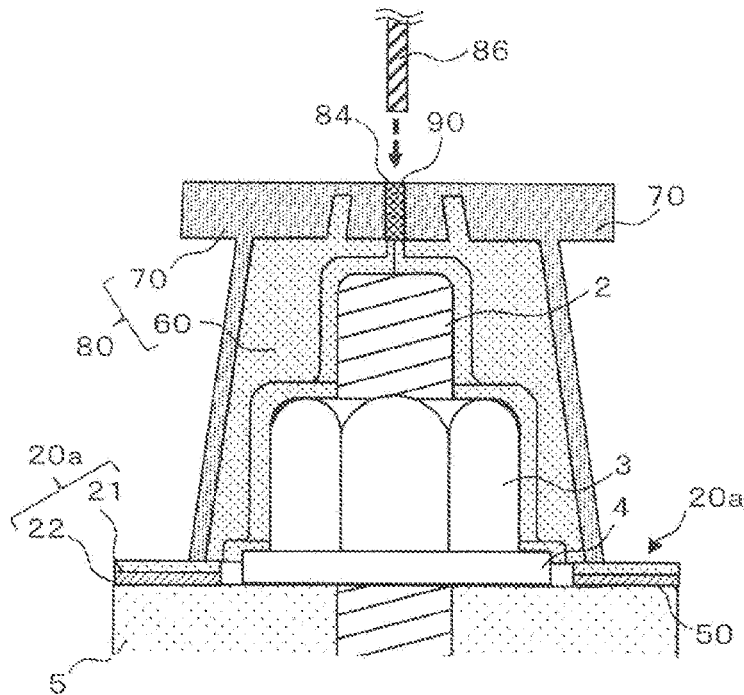
FIGS. 19U and 19V show diagrams for illustrating production procedures of the anticorrosion structure of the fourth embodiment.
Figure 19U:
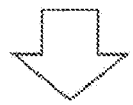
Figure 19V:
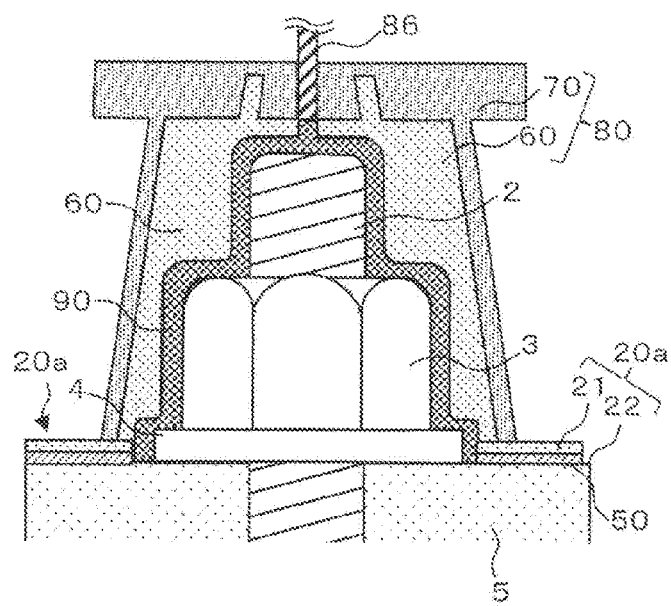
Figure 20W:
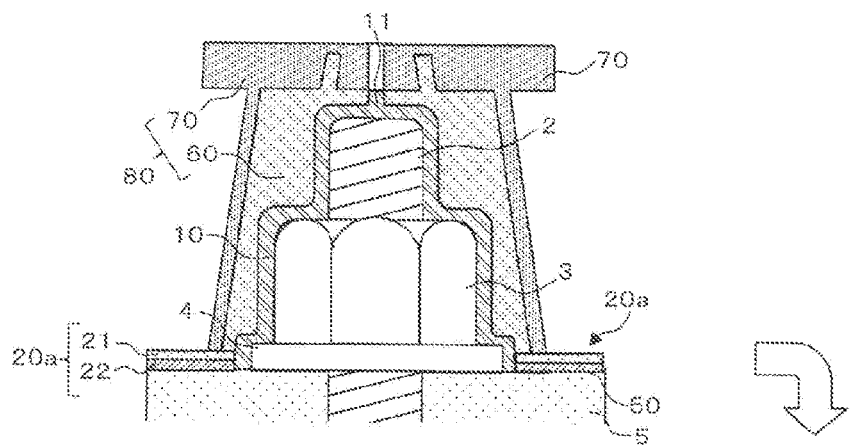
FIGS. 20W, 20N and 20O show diagrams for illustrating production procedures of the anticorrosion structure of the fourth embodiment.
Figure 20N:
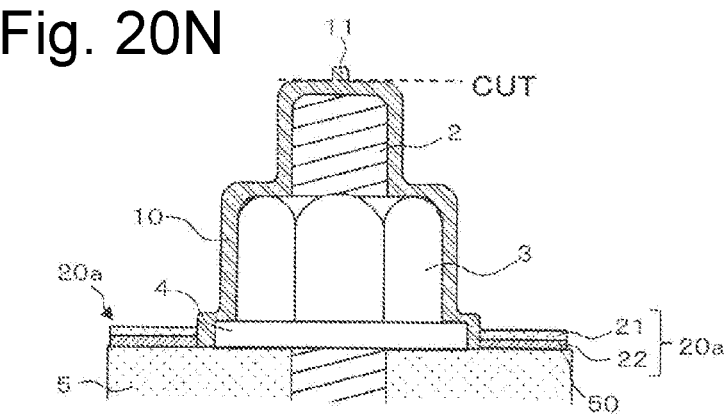
Figure 20O:
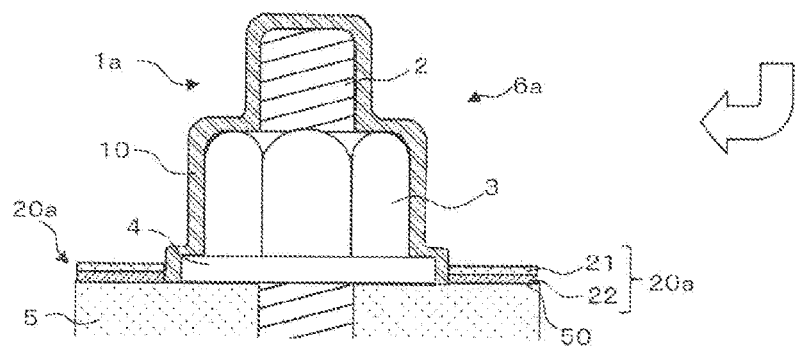

First, in the same manner as in the second embodiment described above, the bolt/nut connecting step (S110) is executed (see FIG. 17A), and the coating layer 20a is formed in the coating layer forming step (S120) (see FIG. 17I). Then, in the same manner as in the above-described third embodiment, the mold closing step (S140), the supplying step (S230), and the curing step (S260) are executed (see FIGS. 18T, 19U, 19V and 20W). Then, in the same manner as in the above-described third embodiment, the mold opening step (S150) and the excess member removing step (S170) are executed, and thus, the anticorrosion structure 6a is produced (see FIGS. 20N and 20O).

Also in the anticorrosion structure 6a produced in this manner, the durability of the anticorrosion effect can be improved in the same manner as in the anticorrosion structures 6 and 6a produced by the production methods of the above-described embodiments. Besides, in the anticorrosion structure 6a, the coating layer 20a can be easily formed by adhering a silicone adhesive sheet onto the connection surface 50, and thus, the durability can be further improved.

3. Other Embodiments

The preferred embodiments of the present invention have been described so far, and it is noted that the present invention is not limited to these embodiments but may be practiced with various modifications.

In the embodiments described above, the anticorrosion member 1 or 1a includes the coating layer 20 or 20a in the anticorrosion structure 6 or 6a, but the coating layer 20 or 20a may not be included. In other words, the anticorrosion member 1 or 1a may include the main body 10 alone.

In the anticorrosion member 1 or 1a, the leg portion of the bolt 2 and the nut 3 protruding beyond the connection surface 50 of the structure 5 are coated, but a head portion of the bolt 2 may be coated in addition to the leg portion of the bolt 2 and the nut 3.

In the anticorrosion member 1 or 1a, the connecting part using the bolt 2 and the nut 3 is coated, but a connecting part including at least one of the bolt 2 and the nut 3 may be coated. The anticorrosion structure 6 or 6a may include the anticorrosion member 1 or 1a on the bolt 2 and the nut 3, on the bolt 2 alone, or on the nut 3 alone.

In each of the production methods for the anticorrosion structures described above, the coating layer forming step (S120) is executed after executing the bolt/nut connecting step (S110), but the bolt/nut connecting step (S110) may be executed after executing the coating layer forming step (S120). In this case, with a hole for inserting the bolt 2 previously formed in the connection surface 50, the coating layer 20 or 20a may be formed in a region on the connection surface 50 excluding the hole. In this case, the coating layer 20 or 20a may be formed between the washer 4 and the connection surface 50.

INDUSTRIAL APPLICABILITY

The present invention is applicable to bolts and nuts used in, for example, various building structures such as bridges, iron towers, buildings, factories, and houses, construction machines, and processing machines.

The invention claimed is:

1. An anticorrosion structure, comprising at least one of a metal bolt and a metal nut, and an anticorrosion member coating a portion, protruding beyond a connection surface, of a connecting part using at least one of the bolt and the nut,
   wherein the anticorrosion member is formed of a silicone rubber obtained by curing a silicone rubber compound,
   wherein the anticorrosion member includes:
   a main body, and
   a coating layer that is formed of a silicone rubber and coats the connection surface, wherein the coating layer includes an adhesion layer at least on a side of the connection surface.

2. The anticorrosion structure of claim 1, wherein the coating layer is formed of the silicone rubber obtained by curing a silicone rubber compound having a plasticity number of 100 to 600.

3. The anticorrosion structure of claim 1, wherein the main body of the anticorrosion member is formed of the silicone rubber obtained by curing the silicone rubber compound having a plasticity number of 100 to 400.

* * * * *